United States Patent
Furukawa et al.

(10) Patent No.: US 10,728,470 B2
(45) Date of Patent: Jul. 28, 2020

(54) IMAGE PROCESSING DEVICE, IMAGE PROCESSING METHOD, AND NON-TRANSITORY COMPUTER READABLE MEDIUM STORING IMAGE PROCESSING PROGRAM

(71) Applicant: OLYMPUS CORPORATION, Hachioji-shi, Tokyo (JP)

(72) Inventors: Eiji Furukawa, Saitama (JP); Junichi Tashiro, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 79 days.

(21) Appl. No.: 16/197,050

(22) Filed: Nov. 20, 2018

(65) Prior Publication Data
US 2019/0089915 A1   Mar. 21, 2019

Related U.S. Application Data

(63) Continuation of application No. PCT/JP2016/067704, filed on Jun. 14, 2016.

(51) Int. Cl.
*H04N 5/341* (2011.01)
*H04N 19/14* (2014.01)
(Continued)

(52) U.S. Cl.
CPC ............. *H04N 5/341* (2013.01); *G06T 7/337* (2017.01); *G06T 9/008* (2013.01); *G06T 9/20* (2013.01);
(Continued)

(58) Field of Classification Search
CPC .... H04N 5/341; H04N 19/119; H04N 19/105; H04N 19/182; H04N 19/176;
(Continued)

(56) References Cited

U.S. PATENT DOCUMENTS

| 4,903,124 | A | 2/1990 | Hoshi et al. |
| 2007/0223824 | A1 | 9/2007 | Kato et al. |
| 2010/0142811 | A1 | 6/2010 | Okamoto et al. |

FOREIGN PATENT DOCUMENTS

| EP | 1841233 A1 | 10/2007 |
| GB | 2217143 A | 10/1989 |

(Continued)

OTHER PUBLICATIONS

International Search Report (and English language translation thereof) dated Jul. 19, 2018 issued in International Application No. PCT/JP2016/067704.

*Primary Examiner* — Twyler L Haskins
*Assistant Examiner* — Angel L Garces-Rivera
(74) *Attorney, Agent, or Firm* — Holtz, Holtz & Volek PC

(57) ABSTRACT

An image processing device includes a processor configured to: extract pixel blocks; detect pixels having a maximum value and a minimum value in each of the pixel blocks; calculate reference value candidates from the maximum and the minimum values; calculate an absolute difference value relative to each of the maximum value, the minimum value, and the reference value candidates; divide each of the pixel blocks into subblocks; select, as a reference value from among the reference value candidates in each of the subblocks, a reference value candidate close to the pixel values in which the pixels included in each of the subblocks are distributed; extract a closest difference value, the minimum value, and the reference value; quantize each of the closest difference values into a quantization value by using the difference value that is the largest from among the closest difference values; and code the quantization value.

15 Claims, 14 Drawing Sheets

(51) Int. Cl.
*H04N 19/176* (2014.01)
*H04N 19/182* (2014.01)
*H04N 19/105* (2014.01)
*H04N 19/119* (2014.01)
*H04N 19/124* (2014.01)
*G06T 7/33* (2017.01)
*G06T 9/00* (2006.01)
*G06T 9/20* (2006.01)
*H04N 9/73* (2006.01)
*H04N 19/186* (2014.01)

(52) U.S. Cl.
CPC ............ *H04N 9/735* (2013.01); *H04N 19/105* (2014.11); *H04N 19/119* (2014.11); *H04N 19/124* (2014.11); *H04N 19/14* (2014.11); *H04N 19/176* (2014.11); *H04N 19/182* (2014.11); *H04N 19/186* (2014.11)

(58) Field of Classification Search
CPC ...... H04N 19/14; H04N 9/735; H04N 19/124; H04N 19/186; G06T 9/20; G06T 9/008; G06T 7/337
See application file for complete search history.

(56) References Cited

FOREIGN PATENT DOCUMENTS

| | | |
|---|---|---|
| JP | 02092084 A | 3/1990 |
| JP | 06105169 | 4/1994 |
| JP | 06216784 A | 8/1994 |
| JP | 08018963 A | 1/1996 |
| JP | 2007036566 A | 2/2007 |
| JP | 4508132 B2 | 5/2010 |

# IMAGE PROCESSING DEVICE, IMAGE PROCESSING METHOD, AND NON-TRANSITORY COMPUTER READABLE MEDIUM STORING IMAGE PROCESSING PROGRAM

CROSS-REFERENCE TO RELATED APPLICATIONS

This is a continuation of International Application PCT/JP2016/067704, with an international filing date of Jun. 14, 2016, which is hereby incorporated by reference herein in its entirety.

TECHNICAL FIELD

The present invention relates to an image processing device, an image processing method, and an image processing program suitable for image compression and image decompression.

BACKGROUND ART

Image compression technologies include variable-length compression in which the bit length after compression is variable and fixed-length compression in which the bit length after compression is fixed.

In general, in an image compression method in which quantization is performed using the difference relative to a neighboring pixel, it is known that compression is easy at a flat portion where data is redundant and compression is not easy at an edge portion where data is not redundant. For this reason, a balance between the image quality and the compression ratio is achieved by performing control so as to realize high compression at a flat portion and low compression at an edge portion. Because the compression ratio in this method is controlled on a process by process basis of compression, this method belongs to variable-length compression, in which the bit length after compression is variable depending on the region to be processed. In a case where a general natural image is compressed and the unit of compression processing is small, there is a high correlation between neighboring pixels, and hence this method can realize high compression. While capable of high compression in this manner, the variable-length compression is problematic in that it is difficult to randomly access compression data recorded in a memory etc.

In contrast, fixed-length compression is characterized by a low compression ratio but easy random access because compression is performed so that the bit length is equal, whether at a flat portion or at an edge portion. Patent Literature 1 discloses one of such fixed-length compression technologies.

Patent Literature 1 describes that a block having a prescribed number of items of pixel data is set as a unit of processing, thus generating compression image data composed of: the maximum value and the minimum value of the pixel data in that block; position information for the maximum value and the minimum value in that block; and quantized data resulting from quantizing the subtraction values obtained by subtracting the minimum value from the pixel data, excluding the maximum value and the minimum value, in that block.

In Patent Literature 1, at the time of quantization, the above-described subtraction values are quantized on the basis of the number of bit shifts that causes the bit length of the difference between the maximum value and the minimum value to become equal to the bit length after quantization. Furthermore, as a result of control being performed so that the bit lengths of blocks after quantization are equal to one another, the pixel data is compressed so that coded data including the header information has the same bit length in all blocks.

CITATION LIST

Patent Literature

{PTL 1}
Publication of Japanese Patent No. 4508132

SUMMARY OF INVENTION

A first aspect of the present invention is an image processing device including: a processor including hardware, wherein the processor is configured to: extract, from an input image, pixel blocks each including a plurality of pixels; detect pixels having a maximum pixel value and a minimum pixel value in each of the pixel blocks; calculate a plurality of reference value candidates that can be calculated from the maximum pixel value and the minimum pixel value; calculate, for each of the pixels included in each of the pixel blocks, an absolute difference value relative to each of the maximum pixel value, the minimum pixel value, and the plurality of reference value candidates; divide each of the pixel blocks into a plurality of subblocks; select, as a reference value from among the plurality of reference value candidates in each of the subblocks, a reference value candidate close to the pixel values in which the pixels included in each of the subblocks are distributed; extract, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value; quantize each of the closest difference values into a quantization value by using, as a reference, the difference value that is the largest from among the plurality of extracted closest difference values; and code the quantization value for each of the pixel blocks.

A second aspect of the present invention is an image processing device including: a processor including hardware, wherein the processor is configured to: extract, from input coded data, a block in which a pixel block including a plurality of pixels is compression-coded; dequantize quantization values included in the block into dequantization values on the basis of quantization width information included in the block; divide the block into a plurality of decoding subblocks corresponding to subblocks of the pixel block set at the time of compression-coding; calculate a reference value for each of the decoding subblocks from a maximum pixel value, a minimum pixel value, and reference value information included in the block; and decode pixel data from the dequantization values, the reference value, and pixel data zone information that is associated with each of the quantization values and that indicates a zone to which each of the pixels belongs.

A third aspect of the present invention is an image processing method including: extracting, from an input image, pixel blocks each including a plurality of pixels; detecting pixels having a maximum pixel value and a minimum pixel value in each of the pixel blocks; calculating a plurality of reference value candidates that can be calculated from the maximum pixel value and the minimum pixel value; calculating, for each of the pixels included in each of the pixel blocks, an absolute difference value relative to each of the maximum pixel value, the minimum pixel value, and the plurality of reference value candidates; dividing each of the pixel blocks into a plurality of subblocks; selecting, as a reference value from among the plurality of reference value candidates in each of the subblocks, a reference value candidate close to the pixel values in which the pixels included in each of the subblocks are distributed; extracting, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value; quantizing each of the closest difference values into a quantization value by using, as a reference, the difference value that is the largest from among the plurality of extracted closest difference values; and coding the quantization value for each of the pixel blocks.

A fourth aspect of the present invention is a non-transitory computer readable medium storing an image processing program for causing a computer to execute image processing including: extracting, from an input image, pixel blocks each including a plurality of pixels; detecting pixels having a maximum pixel value and a minimum pixel value in each of the pixel blocks; calculating a plurality of reference value candidates that can be calculated from the maximum pixel value and the minimum pixel value; calculating, for each of the pixels included in each of the pixel blocks, an absolute difference value relative to each of the maximum pixel value, the minimum pixel value, and the plurality of reference value candidates; dividing each of the pixel blocks into a plurality of subblocks; selecting, as a reference value from among the plurality of reference value candidates in each of the subblocks, a reference value candidate close to the pixel values in which the pixels included in each of the subblocks are distributed; extracting, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value; quantizing each of the closest difference values into a quantization value by using, as a reference, the difference value that is the largest from among the plurality of extracted closest difference values; and coding the quantization value for each of the pixel blocks.

A fifth aspect of the present invention is an image processing method including: extracting, from input coded data, a block in which a pixel block including a plurality of pixels is compression-coded; dequantizing quantization values included in the block into dequantization values on the basis of quantization width information included in the block; dividing the block into a plurality of decoding subblocks corresponding to subblocks of the pixel block set at the time of compression-coding; calculating a reference value for each of the decoding subblocks from a maximum pixel value, a minimum pixel value, and reference value information included in the block; and decoding pixel data from the dequantization values, the reference value, and pixel data zone information that is associated with each of the quantization values and that indicates a zone to which each of the pixels belongs.

A sixth aspect of the present invention is a non-transitory computer readable medium storing an image processing program for causing a computer to execute image processing including: extracting, from input coded data, a block in which a pixel block including a plurality of pixels is compression-coded; dequantizing quantization values included in the block into dequantization values on the basis of quantization width information included in the block; dividing the block into a plurality of decoding subblocks corresponding to subblocks of the pixel block set at the time of compression-coding; calculating a reference value for each of the decoding subblocks from a maximum pixel value, a minimum pixel value, and reference value information included in the block; and decoding pixel data from the dequantization values, the reference value, and pixel data zone information that is associated with each of the quantization values and that indicates a zone to which each of the pixels belongs.

DESCRIPTION OF EMBODIMENTS

An embodiment of an image processing system according to the present invention will now be described in detail with reference to the drawings.

Figure 1:
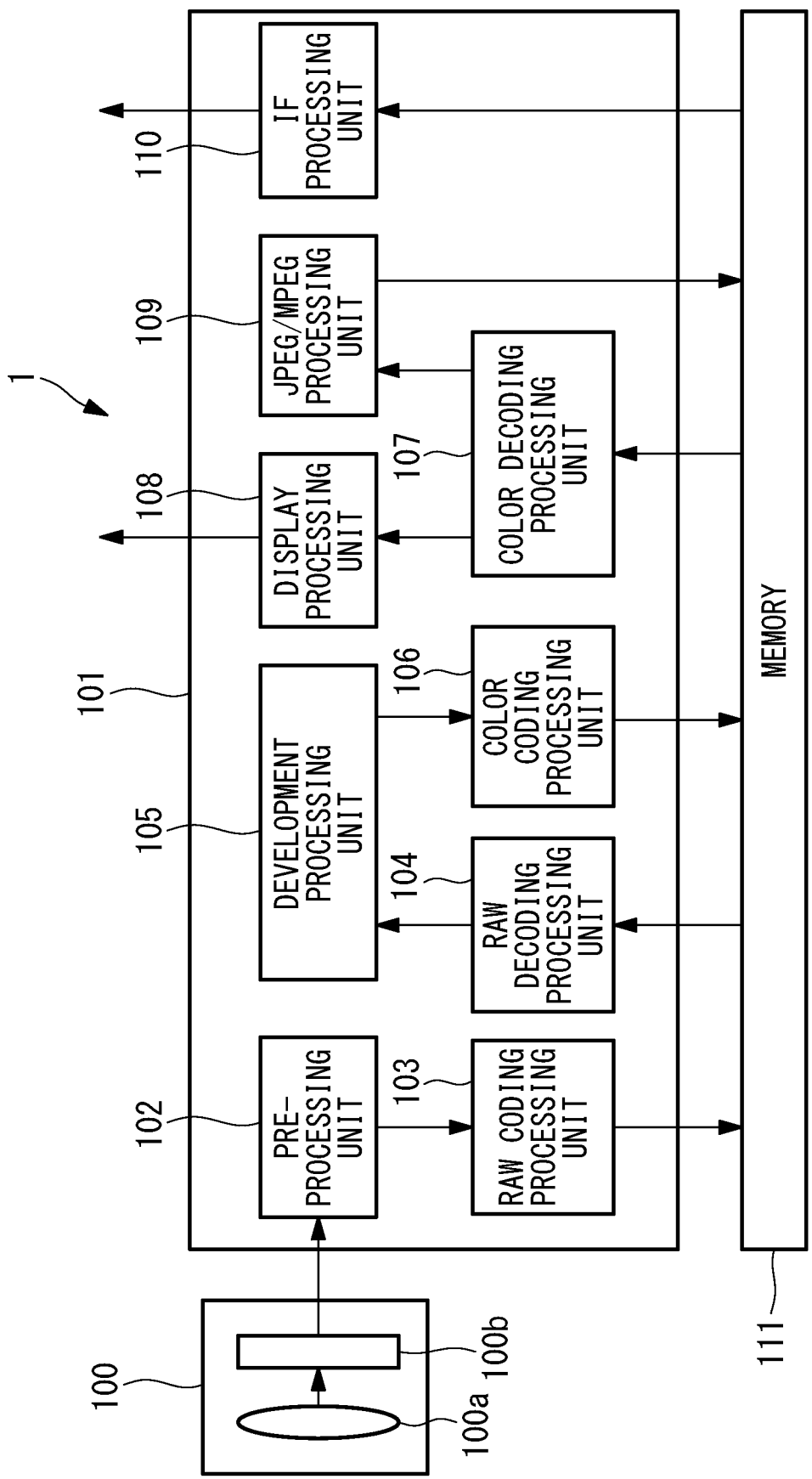
FIG. 1 is a diagram depicting an example configuration of an image processing system according to one embodiment of the present invention.

An image processing system 1 shown in FIG. 1 is, for example, a digital video camera, a digital still camera, or the like for capturing and recording static images and dynamic images.

The image processing system 1 includes an image acquisition unit 100 that acquires an image of a subject and that takes in the image in the form of pixel data; an image signal processing unit 101 for processing the pixel data that has been taken in; and a memory 111 for storing the pixel data etc. The image acquisition unit 100 is connected to the image signal processing unit 101, and the image signal processing unit 101 is connected to the memory 111.

The image acquisition unit 100 includes an image acquisition lens 100a and an image acquisition element 100b.

The image acquisition lens 100a is configured to focus light from the subject and form an optical image of the subject on an image plane of the image acquisition element 100b.

The image acquisition element 100b has, for example, a Bayer array structure and is configured to output RAW data in the Bayer array to the image signal processing unit 101.

The image signal processing unit 101 includes, as function blocks: a pre-processing unit 102; a RAW coding processing unit 103; a RAW decoding processing unit 104; a development processing unit 105; a color coding processing unit 106; a color decoding processing unit 107; a display processing unit 108; a JPEG/MPEG processing unit 109; and an IF (interface) processing unit 110. In addition, the image signal processing unit 101 is provided with a processor (not shown in the figure) and is configured so that the processor executes processes.

The pre-processing unit 102 is connected to the image acquisition element 100b of the image acquisition unit 100 and to the RAW coding processing unit 103. The development processing unit 105 is connected to the RAW decoding processing unit 104 and the color coding processing unit 106. The color decoding processing unit 107 is connected to the display processing unit 108 and the JPEG/MPEG processing unit 109. In addition, the RAW coding processing unit 103, the RAW decoding processing unit 104, the color coding processing unit 106, the color decoding processing unit 107, the JPEG/MPEG processing unit, and the IF processing unit 110 are connected to the memory 111. In addition, the display processing unit 108 is connected to an external display device (not shown in the figure). The IF processing unit 110 is connected to an external recording medium (not shown in the figure).

The memory 111 is a RAM (Random Access Memory), a flash memory, or the like and is configured to be capable of storing compression-coded pixel data.

The operation of the image processing system 1 provided with the above-described configuration will be described below.

An optical image of the subject formed on the image acquisition element 100b via the image acquisition lens 100a is converted into an electrical signal, which is then converted into a digital signal by an AD (Analog-to-Digital) converter etc., thus producing RAW data. The RAW data is subjected to optical black processing, white balance processing, etc. in the pre-processing unit 102, is compression-coded in the RAW coding processing unit 103, and is stored in the memory 111.

The coded data that has been stored is decompression-decoded in the RAW decoding processing unit 104 into decoded RAW data in the Bayer array. The decoded RAW data is subjected to demosaicing processing, noise reduction processing, etc. in the development processing unit 105 and is converted into a color image signal (YCbCr signal or RGB signal). The converted color image signal is compression-coded in the color coding processing unit 106 and is stored in the memory 111.

Coded data of the stored color image is decompression-decoded in the color decoding processing unit 107. The decompression-decoded color image signal is sent to the display device (not shown in the figure) via the display processing unit 108.

In addition, the decompression-decoded color image signal is subjected to static image compression processing, such as JPEG compression, and moving image compression processing, such as MPEG compression, in the JPEG/MPEG processing unit 109 and is stored again in the memory 111 as JPEG/MPEG-coded data. The JPEG/MPEG-coded data that has been stored is transferred to the recording medium, such as an SD card, via the I/F processing unit 110.

The configurations of the RAW coding processing unit (image processing device) 103 and the color coding processing unit (image processing device) 106 provided in the image signal processing unit 101 will be described below in detail with reference to the drawings.

Note that the RAW coding processing unit 103 and the color coding processing unit 106 differ in input image data only and have the same internal configuration.

Figure 2:
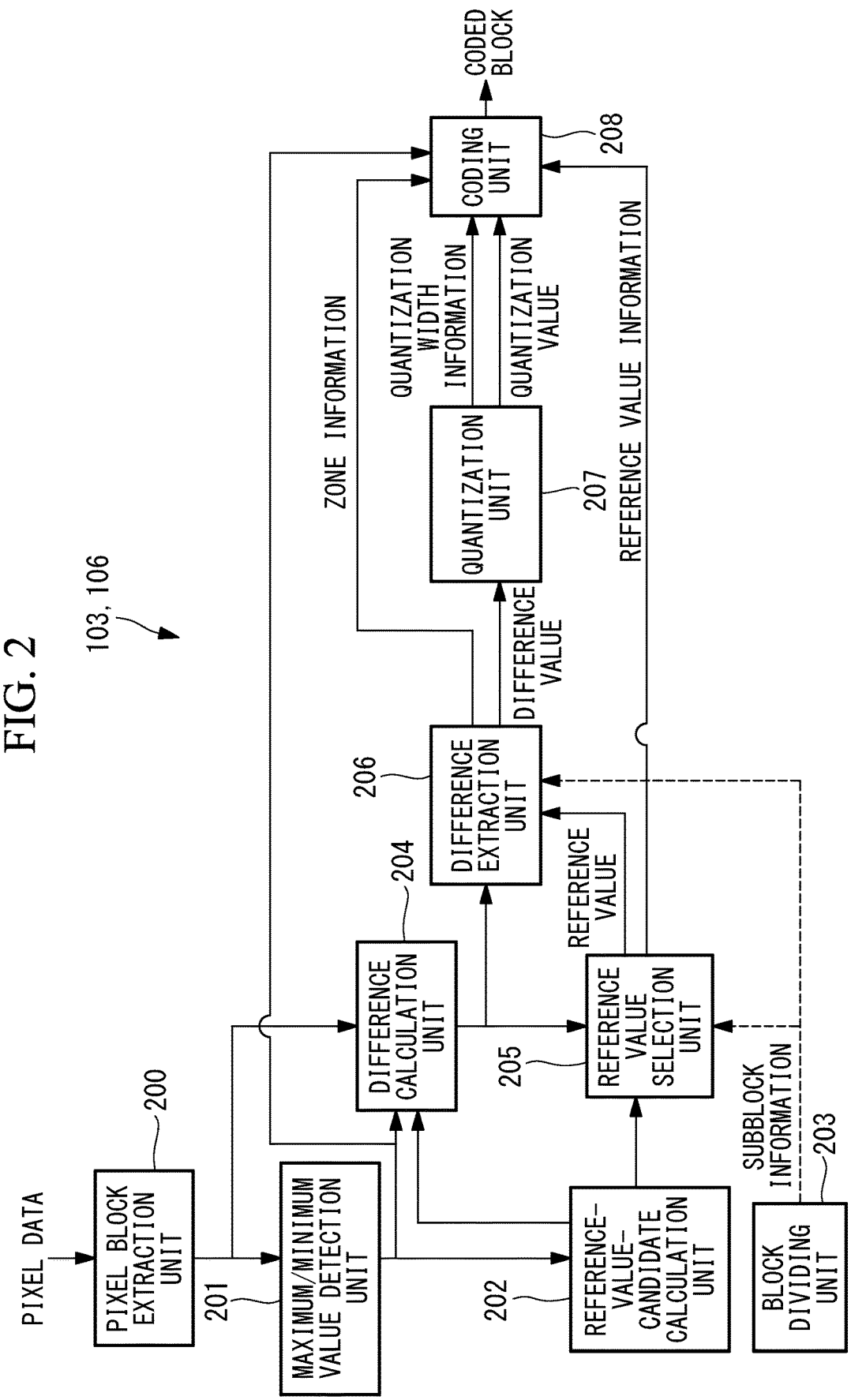
FIG. 2 is a diagram depicting a schematic configuration of a RAW coding processing unit and a color coding processing unit provided in the image processing system in FIG. 1.

As shown in FIG. 2, the RAW coding processing unit 103 and the color coding processing unit 106 each include, as function blocks: a pixel block extraction unit 200; a maximum/minimum value detection unit 201; a reference-value-candidate calculation unit 202; a block dividing unit 203; a difference calculation unit 204; a reference value selection unit 205; a difference extraction unit 206; a quantization unit 207; and a coding unit 208.

The pixel block extraction unit 200 is connected to the maximum/minimum value detection unit 201 and the difference calculation unit 204. The maximum/minimum value detection unit 201 is connected to the reference-value-candidate calculation unit 202, the difference calculation unit 204, and the coding unit 208. The reference-value-candidate calculation unit 202 is connected to the difference calculation unit 204 and the reference value selection unit 205. The block dividing unit 203 is connected to the reference value selection unit 205 and the difference extraction unit 206. The difference calculation unit 204 is connected to the reference value selection unit 205 and the difference extraction unit 206. The reference value selection unit 205 is connected to the difference extraction unit 206 and the coding unit 208. The difference extraction unit 206 is connected to the quantization unit 207 and the coding unit 208. The quantization unit 207 is connect to the coding unit 208.

The pixel block extraction unit 200 is configured to extract, from the input pixel data, pixel blocks, each of which is the unit of processing for compression processing.

Figure 13A:
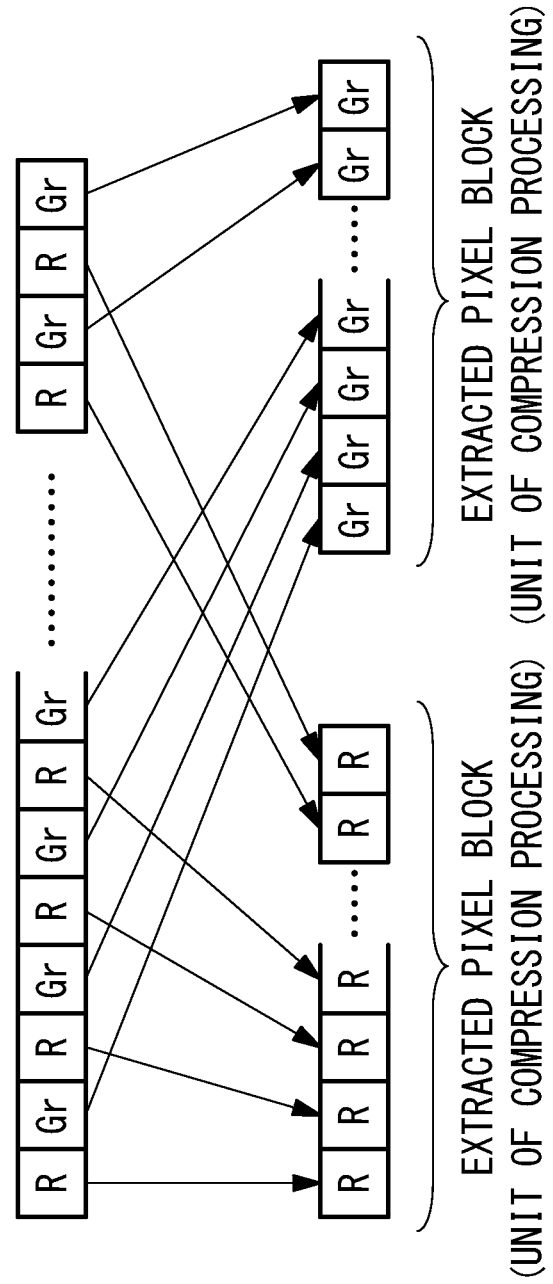
FIG. 13A is a diagram for illustrating an example of pixel data extraction in an image block acquisition unit shown in FIG. 2.

In a case where the input image data is RAW data in a Bayer array, data of the same color are arranged every other pixel, as shown in FIG. 13A, and hence pixels of the same color are extracted, every other pixel as a pixel block, in the same number as the number of pixels corresponding to the unit of processing for compression processing. FIG. 13A shows an example where pixels are extracted every other pixel for each of R and Gr.

Figure 13B:
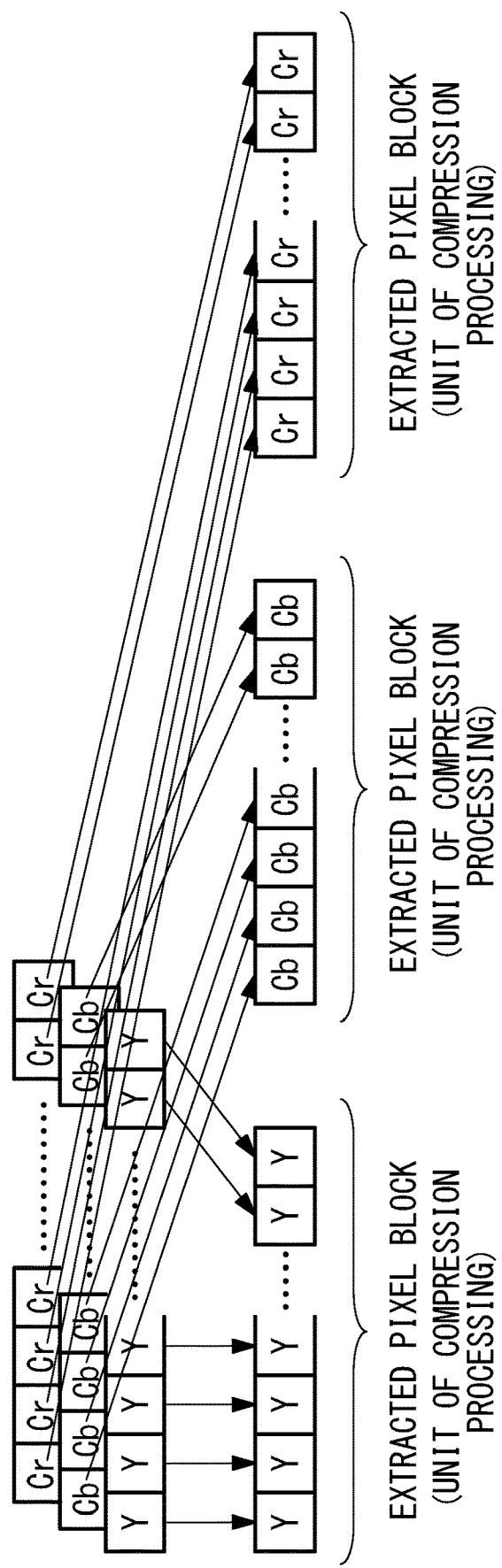
FIG. 13B is a diagram for illustrating an example of pixel data extraction in the image block acquisition unit shown in FIG. 2.

In a case where the input image data is color (YCbCr) data, pixels in the same number as the number of pixels corresponding to the unit of processing for compression processing are extracted as a pixel block in the same manner as in the case of RAW data, individually for each of the luminance signal Y, the color difference signal Cb, and the color difference signal Cr, as shown in FIG. 13B.

In this case, the numbers of pixels included in the pixel blocks for Y, Cb, and Cr may be identical to one another, or alternatively, the numbers of pixels included in the pixel blocks for Y, Cb, and Cr may differ from one another taking into account the 4:4:4 format, 4:2:0 format, etc.

In addition, although one pixel is extracted in the longitudinal direction and a plurality of pixels are extracted in the lateral direction in the examples shown in FIGS. 13A and 13B, the present invention is not limited to these examples. A plurality of pixels may be extracted in the longitudinal direction, and one pixel may be extracted in the lateral direction. Alternatively, a plurality of pixels may be extracted both in the longitudinal direction and the lateral direction.

In addition, the input pixel data may be data the bit length of which is reduced uniformly by applying gradation conversion processing, bit shift processing, etc. to the pixel data after being extracted, as described above.

The maximum/minimum value detection unit 201 is configured to detect a pixel having the maximum pixel value and a pixel having the minimum pixel value from among the plurality of pixels included in each of the pixel blocks extracted in the pixel block extraction unit 200. In a pixel block including pixel p1 through pixel p14 illustrated in FIG. 7, the maximum/minimum value detection unit 201 detects pixel p3 having the maximum pixel value and p12 having the minimum pixel value.

The reference-value-candidate calculation unit 202 is configured to calculate at least two reference value candidates that can be calculated from the maximum pixel value and the minimum pixel value of the pixels detected in the maximum/minimum value detection unit 201. In the example shown in FIG. 7, reference value candidate 1, reference value candidate 2, and reference value candidate 3 are calculated from Expression (1) to Expression (3).

Reference value candidate 1=maximum pixel value−
(((maximum pixel value−minimum pixel value)
>>2)×1) (1)

Reference value candidate 2=maximum pixel value−
(((maximum pixel value−minimum pixel value)
>>2)×2) (2)

Reference value candidate 3=maximum pixel value−
(((maximum pixel value−minimum pixel value)
>>2)×3) (3)

Note that the method for calculating a reference value candidate is not limited to this, and any method can be used as long as a reference value candidate can be calculated from the maximum pixel value and the minimum pixel value.

The block dividing unit 203 is configured to divide each of the pixel blocks extracted in the pixel block extraction unit 200 into at least two subblocks. In the example shown in FIG. 7, a pixel block is divided so that pixel p1 through pixel p7 are included in a first subblock and pixel p8 through pixel p14 are included in a second subblock. Although a block may be divided in any way, it is preferable that the block is divided so that the numbers of pixels included in the subblocks are substantially equal. For example, in a case where the number of pixels included in a pixel block is an even number, the pixel block is divided so that the numbers of pixels included in the subblocks are equal to one another, and in a case where the number of pixels included in a pixel block is an odd number, the pixel block is divided so that the variations in the numbers of pixels included in the subblocks fall within a range of ±1 pixel. Subblock information about the way of dividing a pixel block is used in the reference value selection unit 205, the difference extraction unit 206, and the quantization unit 207. Subblock information may be the number of pixels included in each subblock, position information of a pixel for identifying the border between subblocks, etc., as long as the subblock information can identify how the pixel block is divided.

As shown in Expression (4) to Expression (8), the difference calculation unit 204 is configured to perform subtraction between: each pixel in each of the pixel blocks extracted in the pixel block extraction unit 200; and each of the maximum pixel value and the minimum pixel value detected in the maximum/minimum value detection unit 201 and each of the reference value candidates calculated in the reference-value-candidate calculation unit 202.

$$d\min_k = p_k - \text{minimum pixel value}, k=1, 2, \ldots N \quad (4)$$

$$d\max_k = \text{maximum pixel value} - p_k, k=1, 2, \ldots N \quad (5)$$

$$d\text{base}1_k = |p_k - \text{reference value candidate 1}|, k=1, 2, \ldots N \quad (6)$$

$$d\text{base}2_k = |p_k - \text{reference value candidate 2}|, k=1, 2, \ldots N \quad (7)$$

$$d\text{base}3_k = |p_k - \text{reference value candidate 3}|, k=1, 2, \ldots N \quad (8)$$

Figure 7:
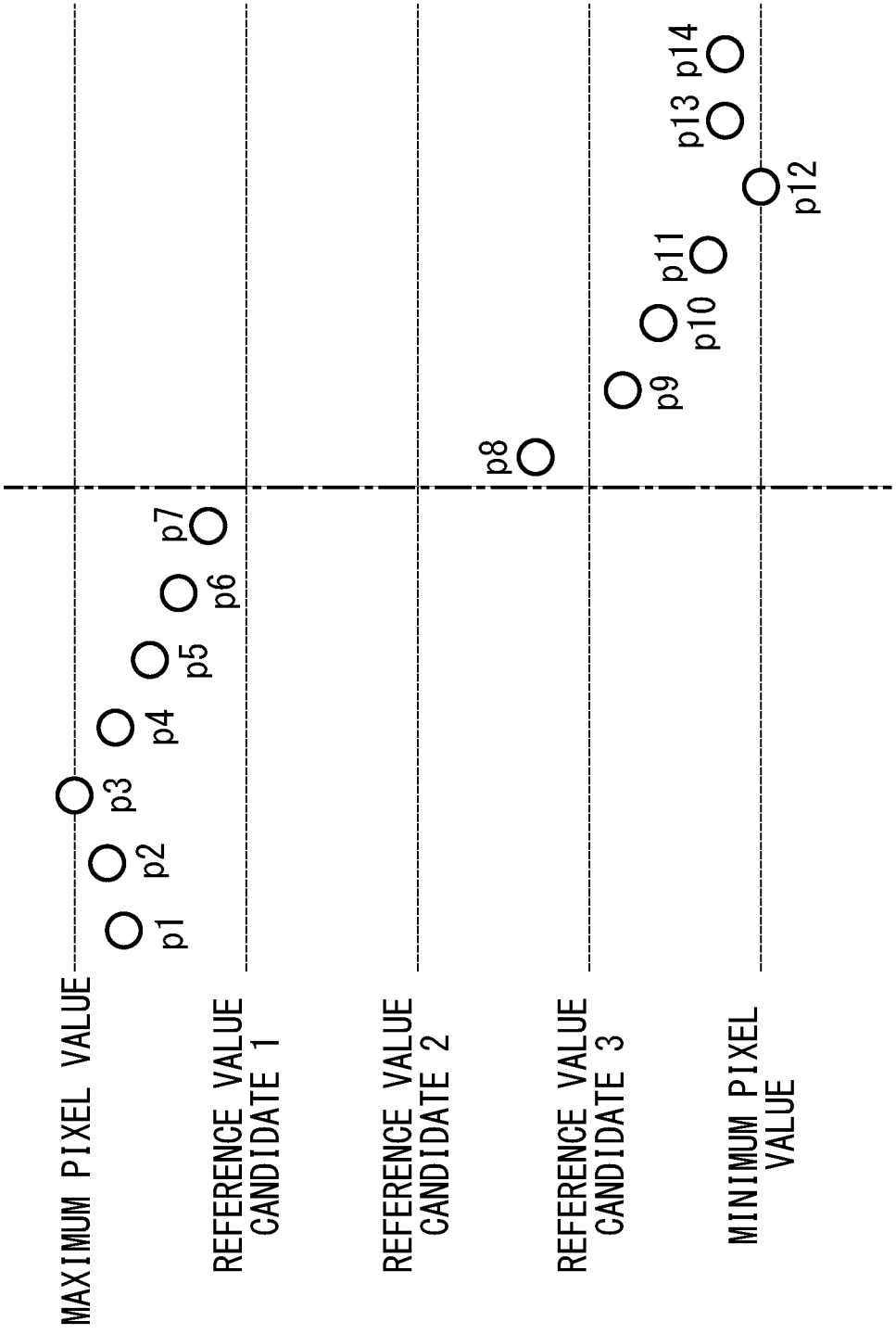
FIG. 7 shows one example of a pixel block, serving as a diagram for illustrating pixel data, the maximum pixel value, the minimum pixel value, and reference value candidates.

Here, N is the number of pixels included in the pixel block, and N=14 in the example shown in FIG. 7. $p_k$ is the pixel value of the k-th pixel included in the pixel block. $d\min_k$ is the difference between $p_k$ and the minimum pixel value, and $d\max_k$ is the difference between $p_k$ and the maximum pixel value. $d\text{ref}1_k$ is the difference between $p_k$ and reference value candidate 1, $d\text{ref}2_k$ is the difference between $p_k$ and reference value candidate 2, and $d\text{ref}3_k$ is the difference between $p_k$ and reference value candidate 3.

Note that $d\min_k$, $d\max_k$, $d\text{ref}1_k$, $d\text{ref}2_k$, and $d\text{ref}3_k$ represent the distances relative to each of the pixel values and are absolute values.

Figure 3:
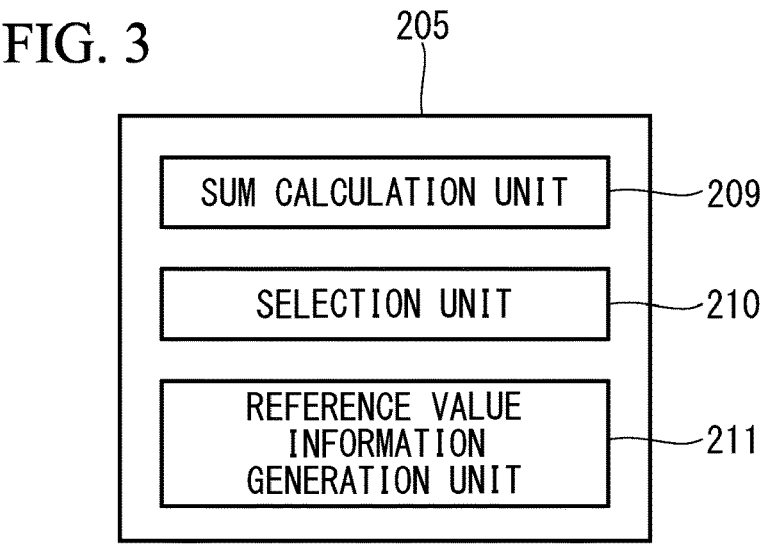
FIG. 3 is a diagram depicting a schematic configuration of a reference value selection unit shown in FIG. 2.

As shown in FIGS. 2 and 3, the reference value selection unit 205 includes a sum calculation unit 209, a selection unit 210, and a reference value information generation unit and is configured to select a reference value for each subblock on the basis of: the plurality of reference value candidates calculated in the reference-value-candidate calculation unit 202; the subblock information obtained in the block dividing unit 203; the difference between each pixel value and the minimum pixel value; the difference between each pixel value and the maximum pixel value; and the differences between each pixel value and the plurality of reference value candidates calculated in the difference calculation unit 204.

The sum calculation unit 209 is configured to calculate, for each reference value candidate and each pixel included in each subblock, the smallest value from among the difference between the pixel value of the current pixel and the minimum pixel value, the difference between the pixel value of the current pixel and the maximum pixel value, and the difference between the pixel value of the current pixel and the current reference value candidate and to add these smallest values calculated for the pixels in each subblock to produce the sum of the minimum differences.

In the example shown in FIG. 7, the sums of the minimum differences, sumb1, sumb2, and sumb3, are calculated for reference value candidate 1, reference value candidate 2, and reference value candidate 3, respectively, as shown in Expression (9) to Expression (11).

$$sumb1 = \sum_{k \in sb_i} \min(dmin_k, dmax_k, dbase1_k) \quad (9)$$

$$sumb2 = \sum_{k \in sb_i} \min(dmin_k, dmax_k, dbase2_k) \quad (10)$$

$$sumb3 = \sum_{k \in sb_i} \min(dmin_k, dmax_k, dbase3_k) \quad (11)$$

Here, $sb_i$ represents the i-th subblock.

The selection unit 210 is configured to compare the sums of the minimum differences for the reference value candidates calculated in the sum calculation unit 209 and to select, as a reference value of that subblock, the reference value candidate obtained when the smallest sum of the minimum differences is achieved.

Figure 8:
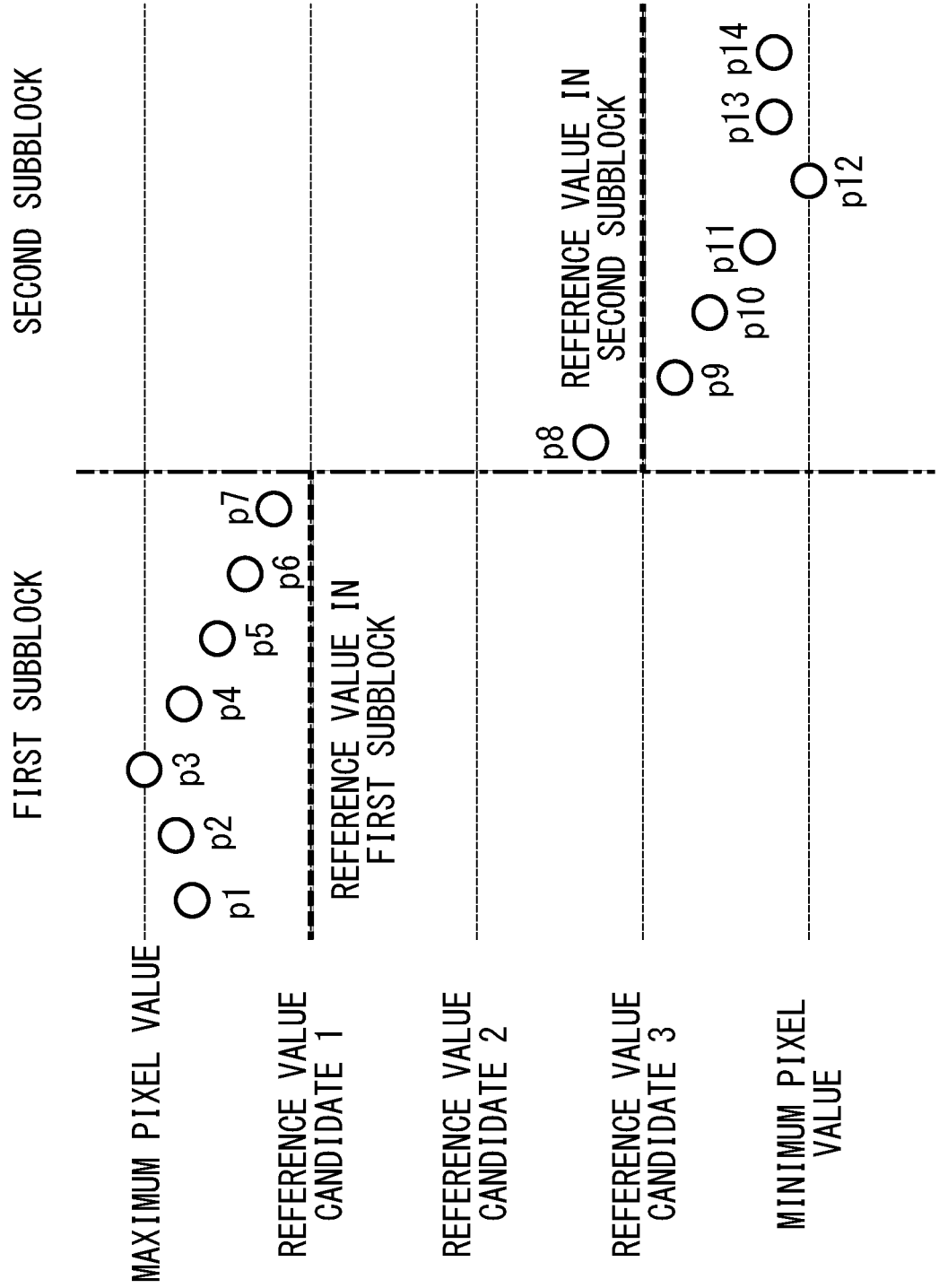
FIG. 8 is a diagram for illustrating an example where subblock-by-subblock selection of a reference value by the reference value selection unit shown in FIG. 2 is applied to the pixel block in FIG. 7.

In the example shown in FIG. 7, reference value candidate 1 is selected as the reference value for the first subblock, and reference value candidate 3 is selected as the reference value for the second subblock, as shown in FIG. 8.

The reference value information generation unit 211 is configured to generate reference value information indicating the reference value selected for each subblock in the selection unit 210.

The reference value information is treated as a part of coded data in the coding unit 208 and hence is represented with a minimum bit length so that the amount of data is prevented, to the maximum possible level, from increasing. There are three reference value candidates in the examples shown in FIGS. 7 and 8, and hence two-bit reference value information is generated. More specifically, the reference value information is set to "00" in a case where reference value candidate 1 is selected as the reference value, the reference value information is set to "01" in a case where reference value candidate 2 is selected as the reference value, and the reference value information is set to "10" in a case where reference value candidate 3 is selected as the reference value. Such reference value information is generated for each subblock.

In this embodiment, the result calculated by using, as a determination criterion for selecting a reference value, all of the difference between the pixel value of each pixel and the minimum pixel value, the difference between the pixel value of each pixel and the maximum pixel value, and the difference between the pixel value of each pixel and the reference value candidates is employed. However, the present invention is not limited to this. The result calculated by using, as a determination criterion, at least one of the difference between the pixel value of each pixel and the minimum pixel value, the difference between the pixel value of each pixel and the maximum pixel value, and the difference between the pixel value of each pixel and the reference value candidates may be employed.

Figure 4:
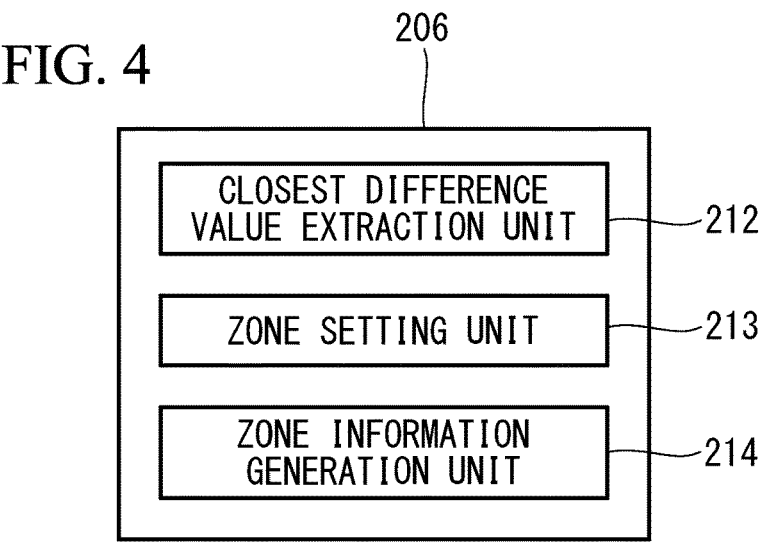
FIG. 4 is a diagram depicting a schematic configuration of a difference extraction unit shown in FIG. 2.

As shown in FIG. 4, the difference extraction unit 206 includes a closest difference value extraction unit 212, a zone setting unit 213, and a zone information generation unit 214.

The closest difference value extraction unit 212 is configured to extract a closest difference value, which is the smallest value from among the absolute difference value between the pixel value of each pixel and the minimum pixel value and the absolute difference value between the pixel value of each pixel and the maximum pixel value that have been calculated in the difference calculation unit 204, as well as the absolute difference value between the pixel value of each pixel and the reference value selected in the reference value selection unit 205. In the example shown in FIG. 9, the extracted closest difference values are indicated by d1 to d14. Note that closest difference value d3 and closest difference value d12 are zero.

The zone setting unit 213 is configured to set four zones by bisecting each subblock between the maximum pixel value and the selected reference value and bisecting each subblock between the minimum pixel value and the selected reference value. In the example shown in FIG. 9, in the first subblock, the zone between the maximum pixel value and the reference value of the first subblock is bisected into zone 00 and zone 01, and the zone between the reference value of the first subblock and the minimum pixel value is bisected into zone 10 and zone 11. In the second subblock, the zone between the maximum pixel value and the reference value of the second subblock is bisected into zone 00 and zone 01, and the zone between the reference value of the second subblock and the minimum pixel value is bisected into zone 10 and zone 11.

The zone information generation unit 214 is configured to generate, as zone information, information about which zone of the four zones that have been set in the zone setting unit 213 each pixel included in each subblock belongs to and to output the information to the coding unit 208.

The zone information is treated as a part of coded data in the coding unit 208 and hence is represented with a minimum bit length so that the amount of data is prevented, to the maximum possible level, from increasing. In the example shown in FIG. 9, zone 00 is assigned "00" as zone information, and zone 01 is assigned "01" as zone information. Also, zone 10 is assigned "10" as zone information, and zone 11 is assigned "11" as zone information.

Figure 9:
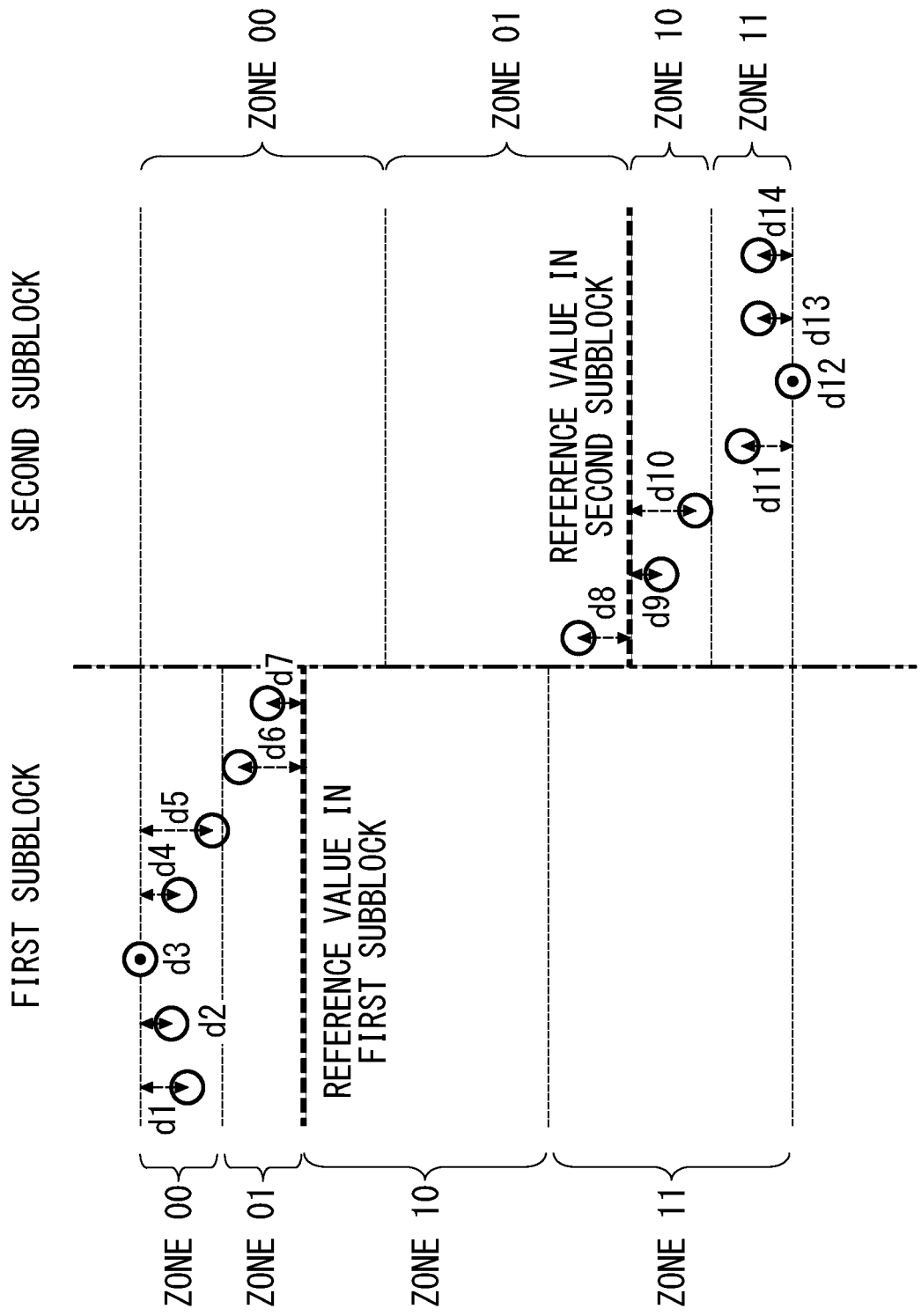
FIG. 9 is a diagram for illustrating an example where difference value extraction and zone information calculation by the difference extraction unit shown in FIG. 2 are applied to the pixel block in FIG. 8.

Therefore, as shown in FIGS. 7 and 9, in the first subblock, pixel p1 to pixel p5 are assigned "00" as zone information, and pixel p6 and p7 are assigned "01" as zone information. In the second subblock, pixel p8 is assigned "01" as zone information, pixel p9 and pixel p10 are assigned "10" as zone information, and pixel p11 to pixel p14 are assigned "11" as zone information.

Note that, in the example shown in FIG. 9, because the first subblock and the second subblock have different reference values, the zones are divided in a different manner. However, a common two-bit code is used as the assigned zone information.

Figure 5:
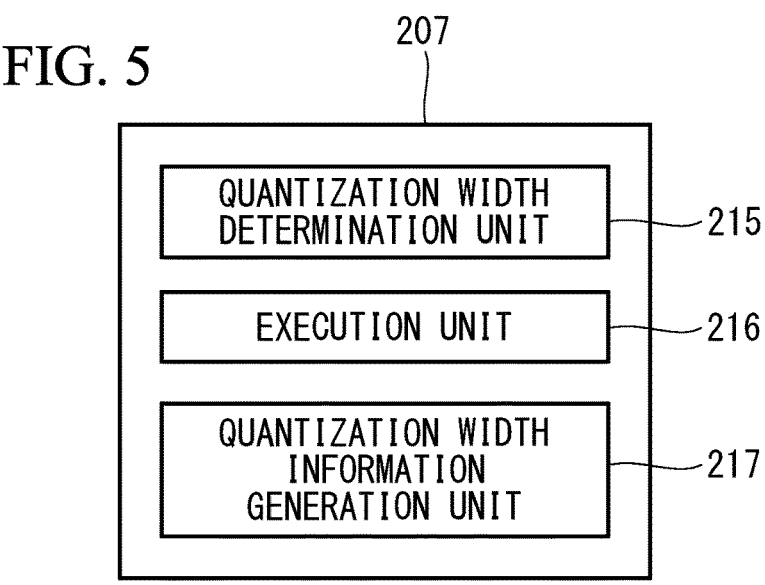
FIG. 5 is a diagram depicting a schematic configuration of a quantization unit shown in FIG. 2.

As shown in FIG. 5, the quantization unit 207 includes a quantization width determination unit 215, an execution unit 216, and a quantization width information generation unit 217.

The quantization width determination unit 215 is configured to determine a quantization width (the number of bit shifts) so that the bit length of the closest difference value having the largest value from among the closest difference values in each of the pixel blocks extracted in the difference extraction unit 206 becomes a target bit length for compression.

The execution unit 216 is configured to apply quantization (bit shift) to all closest difference values included in the pixel block using the quantization width determined in the quantization width determination unit 215, thus generating quantization values.

The quantization width information generation unit 217 is configured to generate quantization information indicating the determined quantization width and output the information to the coding unit 208. In a case where the quantization width information is assigned, for example, three bits, the number of bit shifts 0 to 7 can be expressed. More specifically, "001", "010", "011", "100", "101", "110", and "111" are assigned to the number of bit shifts, 0 to 7, respectively, as the quantization width information.

Note that although how to assign quantization width information is not limited to the above, this scheme needs to be shared with a device responsible for decompression-decoding.

As shown in FIG. 2, the coding unit 208 is configured to generate a coded block on the basis of the maximum pixel value and the minimum pixel value detected in the maximum/minimum value detection unit 201, the zone information generated in the difference extraction unit 206, the quantization width information and quantization values generated in the quantization unit 207, the reference value information obtained in the reference value selection unit 205, and the subblock information obtained in the block dividing unit 203.

Figure 10:
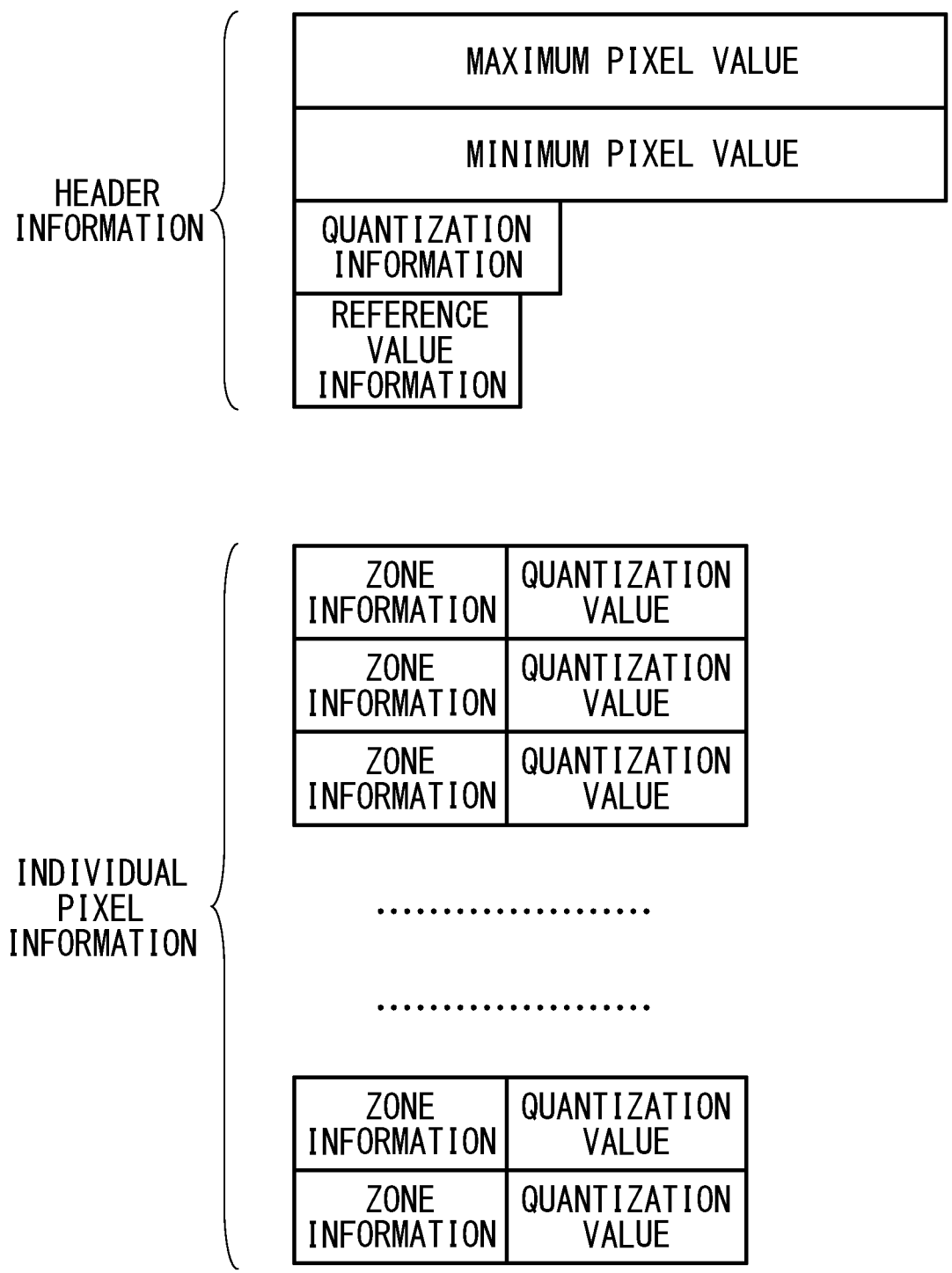
FIG. 10 is a diagram for illustrating coded data generated in the coding unit shown in FIG. 2.

As shown in FIG. 10, the coded block includes header information and individual pixel information. The header information includes the maximum pixel value, the minimum pixel value, the quantization width information, and the reference value information. The coded block includes the same number of items of pixel information as the number of pixels included in the pixel block such that individual pixel information is composed of a set of the zone information and the quantization value of the pixel.

The reference value information is the reference value information for each subblock.

Processing performed in the RAW coding processing unit 103 provided with the above-described configuration will be described with reference to the drawings.

First, as shown in FIG. 2, pixel data, i.e., RAW data in the Bayer array that has been pre-processed in the pre-processing unit 102 (refer to FIG. 1), is input to the pixel block extraction unit 200.

Figure 6:
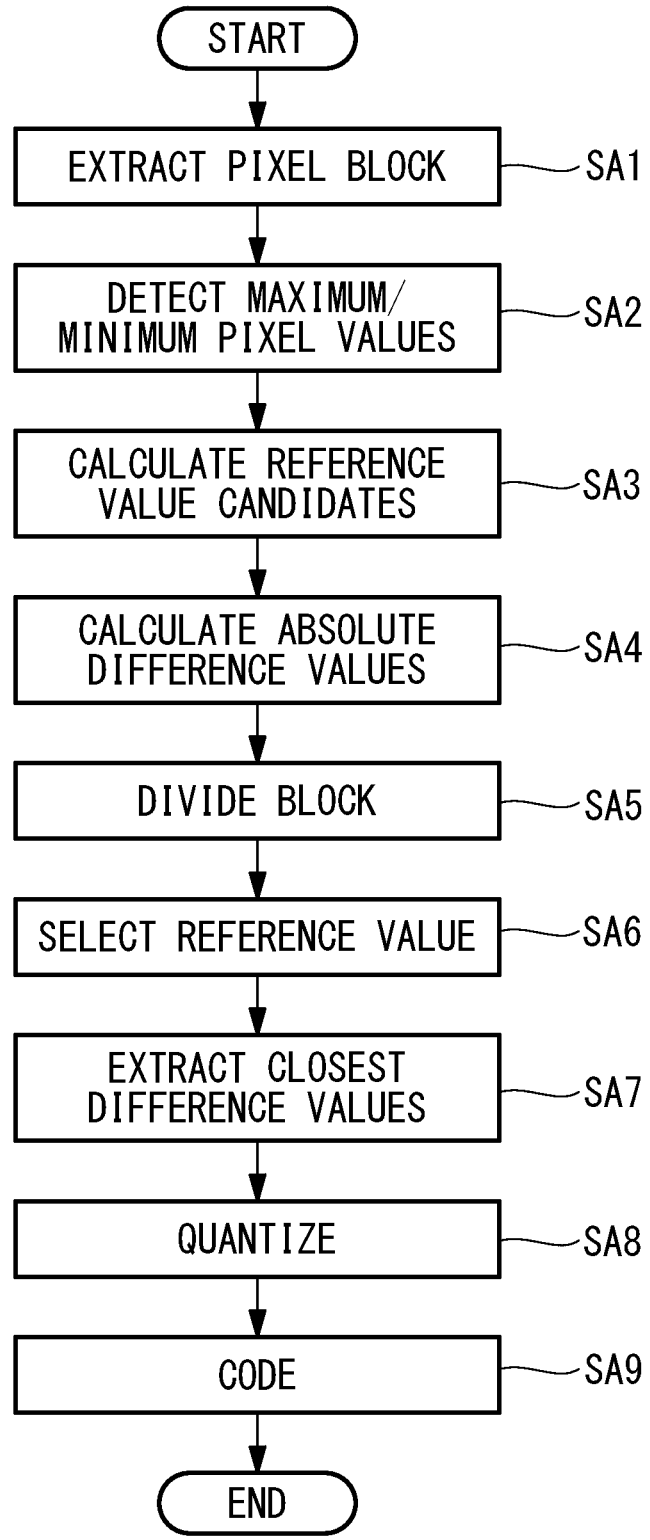
FIG. 6 is a flowchart showing processing in the RAW coding processing unit and the color coding processing unit provided in the image processing system in FIG. 1.

As shown in FIG. 13A, the RAW data input to the pixel block extraction unit 200 is classified by color, and pixel blocks each including a plurality of pixels are extracted (step SA1 in FIG. 6). As shown in FIG. 2, each of the extracted pixel blocks is output to the maximum/minimum value detection unit 201 and the difference calculation unit 204. FIG. 7 shows an example of a pixel block composed of pixel p1 to pixel p14 extracted in the pixel block extraction unit 200. Hereinafter, a case where the pixel block in FIG. 7 is processed will be described for convenience.

Next, in the maximum/minimum value detection unit 201, pixel p3 having the maximum pixel value and pixel p12 having the minimum pixel value are detected from among pixel p1 to pixel p14 included in the pixel block extracted in the pixel block extraction unit 200 (step SA2 in FIG. 6). As shown in FIG. 2, the detected maximum pixel value and minimum pixel value are output to the reference-value-candidate calculation unit 202, the difference calculation unit 204, and the coding unit 208.

Note that, in a case where a plurality of pixels having the same pixel value are present in the pixel block when the minimum pixel value and the maximum pixel value are to be detected, the pixel detected earlier may be treated as a pixel having the minimum pixel value in the case where the minimum pixel value is detected, and a pixel detected later may be treated as a pixel having the maximum pixel value in the case where the maximum pixel value is detected. In this case, however, note that the same treatment is also necessary in the device responsible for decompression-decoding.

Subsequently, in the reference-value-candidate calculation unit 202, reference value candidate 1, reference value candidate 2, and reference value candidate 3, which can be calculated from the maximum pixel value and the minimum pixel value calculated in the maximum/minimum value detection unit 201, are calculated from Expression (1) to Expression (3) described above (step SA3 in FIG. 6). Calculated reference value candidate 1, reference value candidate 2, and reference value candidate 3 are output to the difference calculation unit 204 and the reference value selection unit 205, as shown in FIG. 2.

Then, in the difference calculation unit 204, subtraction, as shown in Expression (4) to Expression (8) described above, is performed to calculate difference values $dmin_k$, $dmax_k$, $dref1_k$, $dref2_k$, and $dref3_k$ for each pixel in the pixel block (step SA4 in FIG. 6). These calculated difference values are output to the reference value selection unit 205 and difference extraction unit 206, as shown in FIG. 2.

In the block dividing unit 203, the pixel block extracted in the pixel block extraction unit 200 is divided into a plurality of subblocks, and subblock information is output to the reference value selection unit 205 and the difference extraction unit 206 (step SA5 in FIG. 6). In the example shown in FIG. 7, pixel p1 to pixel p7 are classified into the first subblock and pixel p8 to pixel p14 are classified into the second subblock so that the numbers of pixels included in the subblocks are the same.

Next, in the reference value selection unit 205, the sum of the minimum differences is calculated for each of the reference value candidates in each subblock on the basis of Expression (9) to Expression (11) described above, and the reference value candidate indicating the smallest sum of the minimum differences is selected as the reference value for that subblock (step SA6 in FIG. 6). The selected reference value is output to the difference extraction unit 206, as shown in FIG. 2. In addition, reference value information, serving as information indicating which reference value candidate has been selected from among reference value candidate 1, reference value candidate 2, and reference value candidate 3, is coded into two-bit codes and is output to the coding unit 208.

As shown in FIG. 8, because pixel values are distributed in a densely packed manner between the maximum pixel value and reference value candidate 1 in the first subblock, reference value candidate 1 is selected as the reference value. Because pixel values are distributed in a densely packed manner between the minimum pixel value and reference value candidate 3 in the second subblock, reference value candidate 3 is selected as the reference value.

As described above, a reference value closer to the pixel distribution in each subblock is selected, and hence when subtraction is performed between the pixel value of each pixel and the reference value, the value can be small. As a result, the amount of data to be compressed can be suppressed to a small amount.

Then, the reference values for the first subblock and the second subblock are output to the difference extraction unit 206. In addition, reference value information "00" indicating reference value candidate 1 selected as the reference value in the first subblock and reference value information "10" indicating reference value candidate 3 selected as the reference value in the second subblock are output to the coding unit 208.

In the difference extraction unit 206, closest difference values are extracted for each pixel in the first subblock and for each pixel in the second subblock (step SA7 in FIG. 6). The extracted closest difference values are output to the quantization unit 207, as shown in FIG. 2. In addition, zone information for each pixel is output to the coding unit 208.

Next, in the quantization unit 207, quantization is performed so that the bit length of closest difference value d5 having the largest value from among closest difference value d1 to closest difference value d14 in the pixel block becomes the target bit length for compression, and the quantization values are output to the coding unit 208 (step SA8). In addition, quantization width information, indicating the number of bit shifts at the time of quantization coded into three bits, is output to the coding unit 208.

As described above, because a quantization width is determined on the basis of the closest difference value that has a small amount of data, compared with the pixel values of the pixels, and that has the maximum value, compression with less deterioration is performed.

Finally, in the coding unit 208, a coded block as shown in FIG. 10 is generated (step SA9 in FIG. 6). The generated coded block is stored in the memory 111.

Next, processing in the color coding processing unit 106 will be described. For the processing in the color coding processing unit 106, processing for extracting a pixel block differs from that in the above-described RAW coding processing unit 103. More specifically, when color (YCbCr) data is input to the pixel block extraction unit 200, the color data is divided into the luminance signal Y, the color difference signal Cb, and the color difference signal Cr, as shown in FIG. 13B, and pixel blocks each including a plurality of pixels are extracted. Processing other than this is the same as the processing in the above-described RAW coding processing unit 103, and hence a description thereof is omitted.

As described above, according to the RAW coding processing unit 103 and the color coding processing unit 106 of this embodiment, a reference value is selected for each subblock, and a closest difference value, which is the distance (absolute difference value) from the relevant pixel to the closest one of the reference value, the maximum pixel value, and the minimum pixel value, is quantized for each pixel. For this reason, even if there is an edge portion in the pixel block, the amount of data to be compressed can be suppressed. As a result, an error in quantization at the time of compression can be made small, and the compression ratio can be made high while still suppressing an image deterioration.

The configurations of the RAW decoding processing unit (image processing device) 104 and the color decoding processing unit (image processing device) 107 provided in the image signal processing unit 101 will be described below in detail with reference to FIG. 11.

Note that the internal configurations of the RAW decoding processing unit 104 and the color decoding processing unit 107 are the same.

Figure 11:
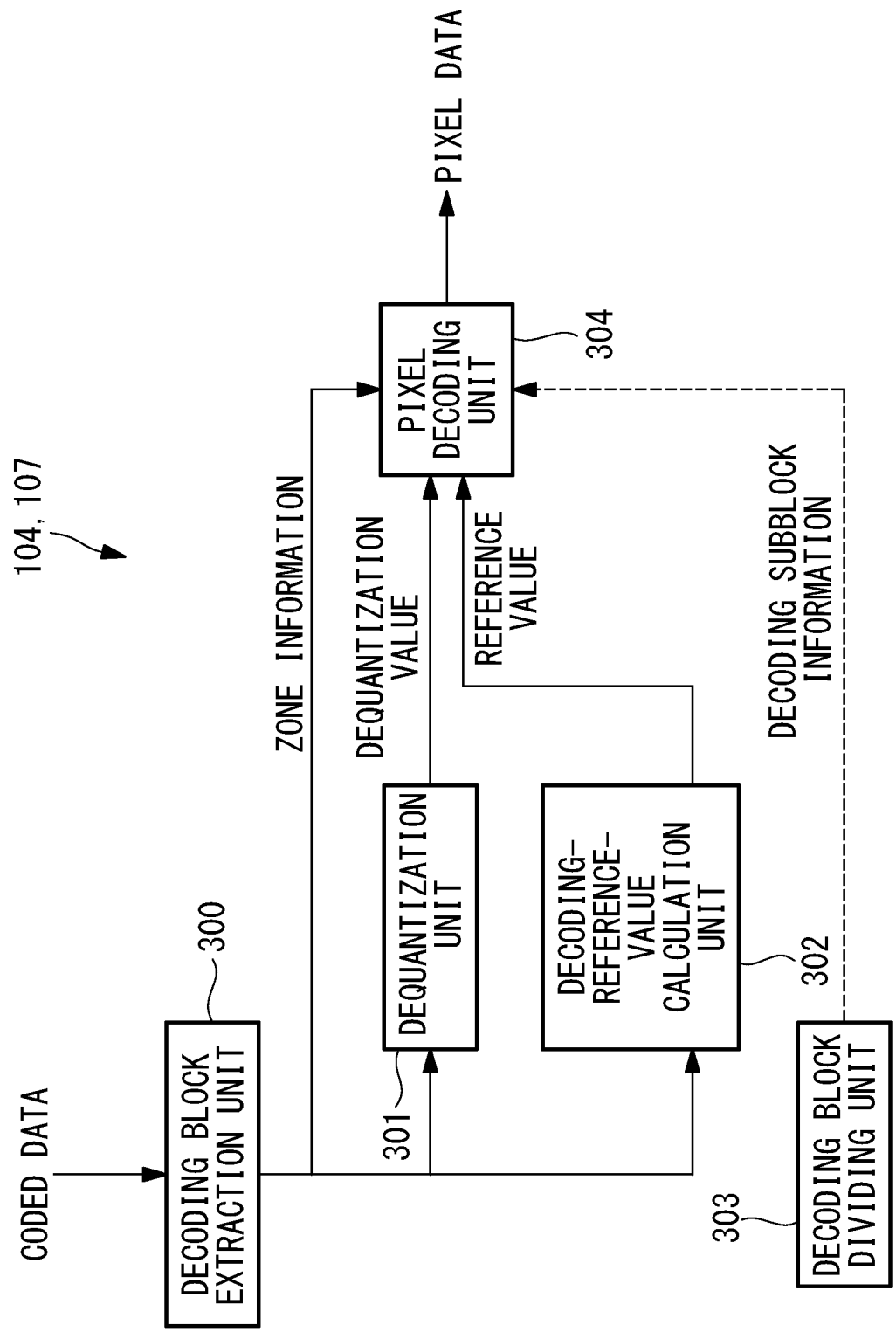
FIG. 11 is a diagram depicting a schematic configuration of a RAW decoding processing unit and a color decoding processing unit provided in the image processing system in FIG. 1.

As shown in FIG. 11, the RAW decoding processing unit 104 and the color decoding processing unit 107 each include, as function blocks: a decoding block extraction unit 300; a dequantization unit 301; a decoding-reference-value calculation unit 302; a decoding block dividing unit 303; and a pixel decoding unit 304.

The decoding block extraction unit 300 is connected to the dequantization unit 301, the decoding-reference-value calculation unit 302, and the pixel decoding unit 304. The dequantization unit 301 is connected to the pixel decoding unit 304, and the decoding-reference-value calculation unit 302 is connected to the pixel decoding unit 304. The decoding block dividing unit 303 is connected to the pixel decoding unit 304.

The decoding block extraction unit 300 is configured to extract, from the input coded data, a block including each item of information shown in FIG. 10, namely, the maximum pixel value, the minimum pixel value, the quantization width information, and the reference value information as the header information, as well as the zone information and quantization value as individual pixel information.

The dequantization unit 301 is configured to dequantize (reverse bit-shift) the quantization value in the individual pixel information by using the quantization width information extracted in the decoding block extraction unit 300.

The decoding-reference-value calculation unit 302 is configured to calculate reference value candidates, by the same calculation method as that employed at the time of compression-coding, from the maximum pixel value and the minimum pixel value extracted in the decoding block extraction unit 300 and to calculate, from those calculated reference value candidates, a reference value for each subblock by using the reference value information extracted in the decoding block extraction unit 300.

The decoding block dividing unit 303 is configured to divide the pixel block into a plurality of decoding subblocks corresponding to the subblocks in the pixel block that were set at the time of compression-coding and to output the decoding subblock information, indicating the way of dividing the pixel block, to the pixel decoding unit 304. For example, the decoding subblock information may be the number of pixels included in each decoding subblock or may be, for example, position information of the pixel for identifying the border between the decoding subblocks.

The pixel decoding unit 304 is configured to perform decoding on the basis of the zone information obtained from the decoding block extraction unit 300, the dequantization value generated in the dequantization unit, the reference value calculated in the decoding-reference-value calculation unit, and the subblock information obtained from the decoding block dividing unit.

More specifically, each pixel value is decoded by subtracting the dequantization value from the maximum pixel value in a case where the corresponding zone information is "00", is decoded by adding the dequantization value to the reference value in a case where the corresponding zone information is "01", is decoded by subtracting the dequantization value from the reference value in a case where the corresponding zone information is "10", and is decoded by adding the dequantization value to the minimum pixel value in a case where the corresponding zone information is "11".

Next, processing performed in the RAW decoding processing unit 104 or the color decoding processing unit 107 provided with the above-described configuration will be described with reference to the drawings.

Figure 12:
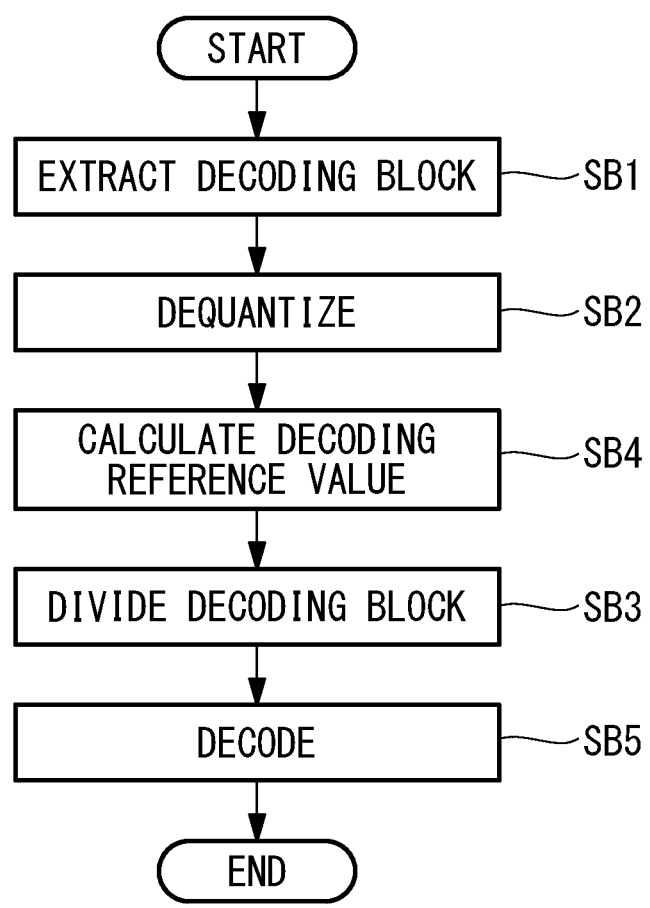
FIG. 12 is a flowchart showing processing in the RAW decoding processing unit and the color decoding processing unit provided in the image processing system in FIG. 1.

As shown in FIG. 11, in the decoding block extraction unit 300, a block including each item of information shown in FIG. 10 is extracted from the input coded data (step SB1 in FIG. 12).

Then, in the dequantization unit 301, the quantization value in the individual pixel information extracted in the decoding block extraction unit 300 is dequantized by using the quantization width information extracted in the decoding block extraction unit 300, thus generating a dequantization value (step SB2 in FIG. 12).

Next, in the decoding-reference-value calculation unit 302, reference value candidates are calculated, by the same calculation method as that employed at the time of compression-coding, from the maximum pixel value and the minimum pixel value extracted in the decoding block extraction unit 300, and a reference value for each subblock is calculated, from the calculated reference value candidates, by using the reference value information extracted in the decoding block extraction unit 300 (step SB3 in FIG. 12).

In addition, in the decoding block dividing unit 303, the pixel block is divided into a plurality of subblocks corresponding to the subblocks of the pixel block that were set at the time of compression-coding, and subblock information, indicating the way of dividing the pixel block, is output to the pixel decoding unit 304 (step SB4 in FIG. 12).

Finally, in the pixel decoding unit 304, the dequantization value calculated in the dequantization unit 301 uses the zone information extracted in the decoding block extraction unit 300 and the reference values calculated in the decoding-reference-value calculation unit 302, thereby decoding the pixel data (step SB5 in FIG. 12).

As described above, according to the RAW decoding processing unit 104 or the color decoding processing unit 107 of this embodiment, the coded block, which is composed of: header information including the maximum pixel value, the minimum pixel value, the quantization width information, and the reference value information; and individual pixel information including a set of the zone information and quantization value of the pixel, can be decoded into pixel data.

Note that in a case where the bit length was reduced via gradation conversion processing, bit shift processing, etc. at the time of compression-coding, reverse gradation conversion processing, reverse bit shift, etc., which have characteristics opposite to those at the time of compression-coding, are performed.

Although the embodiments of the present invention have been described in detail with reference to the drawings, the specific configuration is not limited to those in the embodiments but includes design changes etc. that do not depart from the spirit of the present invention.

Figure 14:
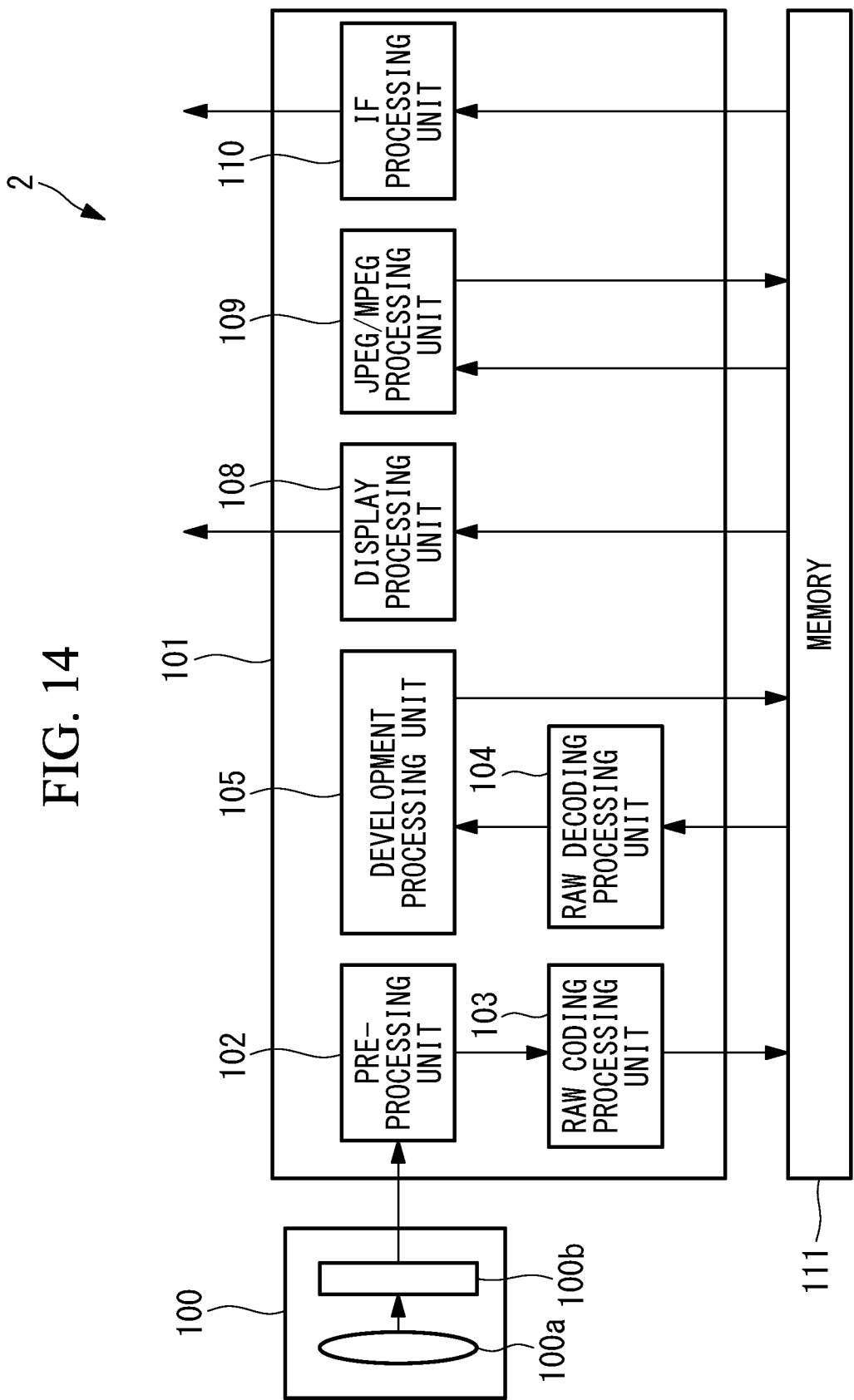
FIG. 14 is a diagram depicting an example configuration of an image processing system according to another embodiment of the present invention.
Figure 15:
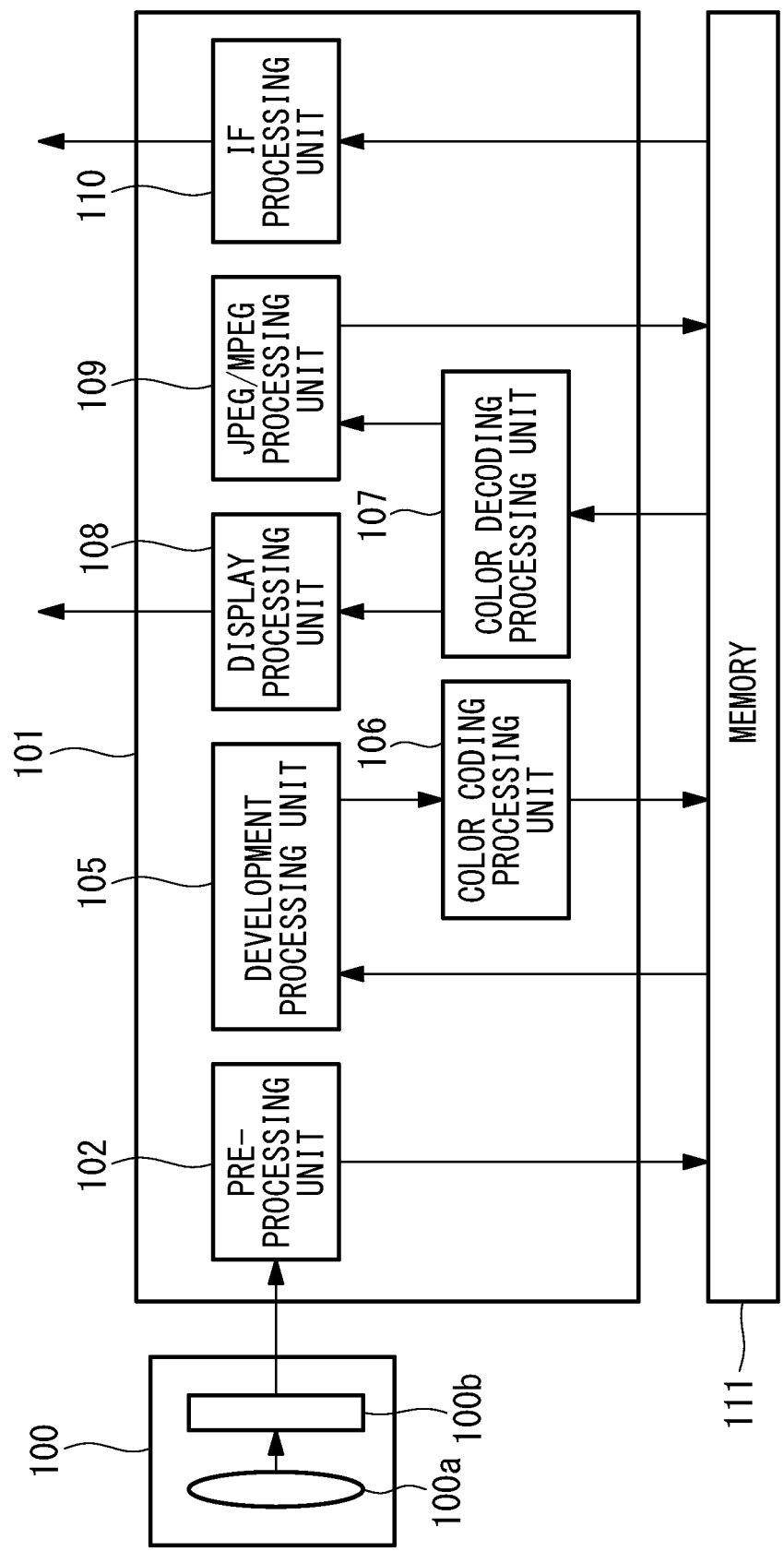
FIG. 15 is a diagram depicting an example configuration of an image processing system according to another embodiment of the present invention.

For example, although in the above-described embodiments, the image processing system 1 is provided with the RAW coding processing unit 103, the RAW decoding processing unit 104, the color coding processing unit 106, and the color decoding processing unit 107, instead of this, the present invention may be an image processing system 2 not including the color coding processing unit 106 and the color decoding processing unit 107, as shown in FIG. 14, or an image processing system 3 not including the RAW coding processing unit 103 and the RAW decoding processing unit 104, as shown in FIG. 15.

As a result, the above-described embodiment leads to the following aspects.

A first aspect of the present invention is an image processing device including: a pixel block extraction unit for extracting, from an input image, pixel blocks each including a plurality of pixels; a maximum/minimum value detection unit for detecting pixels having a maximum pixel value and a minimum pixel value in each of the pixel blocks; a reference-value-candidate calculation unit for calculating a plurality of reference value candidates that can be calculated from the maximum pixel value and the minimum pixel value; a difference calculation unit for calculating, for each of the pixels included in each of the pixel blocks, an absolute difference value relative to each of the maximum pixel value, the minimum pixel value, and the plurality of reference value candidates; a block dividing unit for dividing each of the pixel blocks into a plurality of subblocks; a reference value selection unit for selecting, as a reference value from among the plurality of reference value candidates in each of the subblocks, a reference value candidate close to the pixel values in which the pixels included in each of the subblocks are distributed; a difference extraction unit for extracting, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value; a quantization unit for quantizing each of the closest difference values into a quantization value by using, as a reference, the difference value that is the largest from among the plurality of extracted closest difference values; and a coding unit for coding the quantization value for each of the pixel blocks.

According to the image processing device of the above-described first aspect, pixels having the maximum pixel value and the minimum pixel value are detected by the maximum/minimum value detection unit from a pixel block extracted by the pixel block extraction unit. From the maximum pixel value and minimum pixel value, a plurality of reference value candidates are calculated by the reference-value-candidate calculation unit. Then, by using the absolute difference values calculated by the difference calculation unit, a reference value for each of the subblocks generated by the block dividing unit is selected by the reference value selection unit from among the plurality of reference value candidates. The closest difference value for each of the pixels is extracted by the difference extraction unit by using the selected reference value, as well as the absolute difference value between each pixel and the maximum pixel value and the absolute difference value between each pixel and the minimum pixel value calculated by the difference calculation unit. The extracted closest difference value is quantized by the quantization unit, and the quantized closest difference value is coded by the coding unit.

In this manner, the reference value is selected for each of the subblocks, and the closest difference value, which is the distance (absolute difference value) relative to the value that is closest to the pixel value of the current pixel from among the reference value, the maximum pixel value, and the minimum pixel value, is quantized for each of the pixels. For this reason, even if there is an edge portion in the pixel block, the amount of data to be compressed can be suppressed to be small. As a result, an error in quantization at the time of compression can be made small, making it possible to enhance the compression ratio while still suppressing an image deterioration.

In the above-described image processing device, the reference value selection unit may include: a sum calculation unit for adding, for each of the reference value candidates in each of the subblocks, an absolute difference value that is the smallest from among the absolute difference values relative to the current reference value candidate, the maximum pixel value, and the minimum pixel value calculated for each of the pixels to obtain the sum of the minimum differences for each of the reference value candidates; and a selection unit for selecting, as the reference value, a reference value candidate when the smallest sum of the minimum differences is achieved from among the plurality of sums of the minimum differences.

According to this configuration, the reference value closer to the pixel distribution in each subblock is selected, and hence when subtraction between the pixel value of each pixel and the reference value is performed, the resultant value can be small. For this reason, the amount of data to be compressed can be suppressed to be smaller. As a result, an error in quantization at the time of compression can be made small, making it possible to enhance the compression ratio while still suppressing an image deterioration.

In any of the above-image processing devices, the difference extraction unit may include: a zone setting unit for setting a plurality of zones on the basis of the maximum pixel value, the reference value, and the minimum pixel value; and a zone information generation unit for generating, for each of the pixels, zone information that indicates a zone to which the pixel belongs.

According to this configuration, because it is possible to recognize to which zone each pixel belongs, it is possible to identify to which of the above-described maximum pixel value, the above-described reference value, and the above-described minimum pixel value, the closest difference value corresponding to each pixel is closest.

In any of the above-image processing devices, the quantization unit may include: a quantization width determination unit for determining a quantization width so that the bit length of the difference value that is the largest from among the plurality of closest difference values is a target bit length; and a quantization width information generation unit for generating quantization width information indicating the quantization width.

According to this configuration, the quantization width is determined on the basis of the closest difference value that is the largest and that has a small amount of data compared with the pixel value of each pixel, and hence the amount of data to be compressed can be suppressed to be smaller. As a result, an error in quantization at the time of compression can be made small, hence making it possible to perform compression with less deterioration.

In any of the above-image processing devices, the input image may be RAW data.

In any of the above-image processing devices, the input image may be data for a luminance signal or a color difference signal.

In any of the above-image processing devices, the input image may be data for each color of a color signal.

In any of the above-image processing devices, the input image may be pixel data in which the bit lengths are all identical as a result of converting RAW data or quantizing the RAW data in a fixed manner.

In any of the above-image processing devices, the input image may be pixel data in which the bit lengths are all identical as a result of converting a luminance signal or a color difference signal or quantizing the luminance signal or the color difference signal in a fixed manner.

In any of the above-image processing devices, the input image may be pixel data in which the bit lengths are all identical as a result of converting data for each color of a color signal or quantizing the data for each color of a color signal in a fixed manner.

A second aspect of the present invention is an image processing device including: a decoding block extraction unit for extracting, from input coded data, a block in which a pixel block including a plurality of pixels is compression-coded; a dequantization unit for dequantizing quantization values included in the block into dequantization values on the basis of quantization width information included in the block; a decoding block dividing unit for dividing the block into a plurality of decoding subblocks corresponding to subblocks of the pixel block set at the time of compression-coding; a decoding-reference-value calculation unit for calculating a reference value for each of the decoding subblocks from a maximum pixel value, a minimum pixel value, and reference value information included in the block; and a pixel decoding unit for decoding pixel data from the dequantization values, the reference value, and pixel data zone information that is associated with each of the quantization values and that indicates a zone to which each of the pixels belongs.

According to the image processing device of the above-described second aspect, the quantization values included in the block extracted by the decoding block extraction unit are dequantized by the dequantization unit on the basis of the quantization width information included in the block, thus generating dequantization values. In addition, the reference value for each of the decoding subblocks is calculated by the decoding-reference-value calculation unit on the basis of the maximum pixel value, the minimum pixel value, and the reference value information included in the block. Then, the dequantization values are decoded into pixel data by the pixel decoding unit on the basis of the above-described reference value and zone information, which is associated with each of the above-described quantization values and which indicates the zone to which each of the above-described pixels belongs.

According to this configuration, it is possible to decode, into pixel data, a coded block including: header information, which is composed of the maximum pixel value, the minimum pixel value, the quantization width information, and the reference value information; and individual pixel information, which is composed of a set of zone information and quantization value for each pixel.

A third aspect of the present invention is an image processing method including: a step of extracting, from an input image, pixel blocks each including a plurality of pixels; a step of detecting pixels having a maximum pixel value and a minimum pixel value in each of the pixel blocks; a step of calculating a plurality of reference value candidates that can be calculated from the maximum pixel value and the minimum pixel value; a step of calculating, for each of the pixels included in each of the pixel blocks, an absolute difference value relative to each of the maximum pixel value, the minimum pixel value, and the plurality of reference value candidates; a step of dividing each of the pixel blocks into a plurality of subblocks; a step of selecting, as a reference value from among the plurality of reference value candidates in each of the subblocks, a reference value candidate close to the pixel values in which the pixels included in each of the subblocks are distributed; a step of extracting, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value; a step of quantizing each of the closest difference values into a quantization value by using, as a reference, the difference value that is the largest from among the plurality of extracted closest difference values; and a step of coding the quantization value for each of the pixel blocks.

A fourth aspect of the present invention is an image processing program for causing a computer to execute: a process for extracting, from an input image, pixel blocks each including a plurality of pixels; a process for detecting pixels having a maximum pixel value and a minimum pixel value in each of the pixel blocks; a process for calculating a plurality of reference value candidates that can be calculated from the maximum pixel value and the minimum pixel value; a process for calculating, for each of the pixels included in each of the pixel blocks, an absolute difference value relative to each of the maximum pixel value, the minimum pixel value, and the plurality of reference value candidates; a process for dividing each of the pixel blocks into a plurality of subblocks; a process for selecting, as a reference value from among the plurality of reference value candidates in each of the subblocks, a reference value candidate close to the pixel values in which the pixels included in each of the subblocks are distributed; a process for extracting, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value; a process for quantizing each of the closest difference values into a quantization value by using, as a reference, the difference value that is the largest from among the plurality of extracted closest difference values; and a process for coding the quantization value for each of the pixel blocks.

A fifth aspect of the present invention is an image processing method including: a step of extracting, from input coded data, a block in which a pixel block including a plurality of pixels is compression-coded; a step of dequantizing quantization values included in the block into dequantization values on the basis of quantization width information included in the block; a step of dividing the block into a plurality of decoding subblocks corresponding to subblocks of the pixel block set at the time of compression-coding; a step of calculating a reference value for each of the decoding subblocks from a maximum pixel value, a minimum pixel value, and reference value information included in the block; and a step of a pixel decoding unit for decoding pixel data from the dequantization values, the reference value, and pixel data zone information that is associated with each of the quantization values and that indicates a zone to which each of the pixels belongs.

A sixth aspect of the present invention is an image processing program for causing a computer to execute: a process for extracting, from input coded data, a block in which a pixel block including a plurality of pixels is compression-coded; a process for dequantizing quantization values included in the block into dequantization values on the basis of quantization width information included in the block; a process for dividing the block into a plurality of decoding subblocks corresponding to subblocks of the pixel block set at the time of compression-coding; a process for calculating a reference value for each of the decoding subblocks from a maximum pixel value, a minimum pixel value, and reference value information included in the block; and a process for decoding pixel data from the dequantization values, the reference value, and pixel data zone information that is associated with each of the quantization values and that indicates a zone to which each of the pixels belongs.

The present invention affords an advantage in that high compression can be achieved while still suppressing a deterioration in image quality even in a region spanning an edge portion in which the differences between pixel values are large.

REFERENCE SIGNS LIST

103 RAW coding processing unit (image processing device)
104 RAW decoding processing unit (image processing device)
106 Color coding processing unit (image processing device)
107 Color decoding processing unit (image processing device)
200 Pixel block extraction unit
201 Maximum/minimum value detection unit
202 Reference-value-candidate calculation unit
203 Block dividing unit
204 Difference calculation unit
205 Reference value selection unit
206 Difference extraction unit
207 Quantization unit
208 Coding unit
209 Sum calculation unit
210 Selection unit
211 Reference value information generation unit
212 Closest difference value extraction unit
213 Zone setting unit
214 Zone information generation unit
215 Quantization width determination unit
216 Execution unit
217 Quantization width information generation unit
300 Decoding block extraction unit
301 Dequantization unit
302 Decoding-reference-value calculation unit
303 Decoding block dividing unit
304 Pixel decoding unit

The invention claimed is:
1. An image processing device comprising:
a processor comprising hardware, wherein the processor is configured to:
extract, from an input image, pixel blocks each including a plurality of pixels;
detect pixels having a maximum pixel value and a minimum pixel value in each of the pixel blocks;
calculate a plurality of reference value candidates that can be calculated from the maximum pixel value and the minimum pixel value;
calculate, for each of the pixels included in each of the pixel blocks, an absolute difference value relative to each of the maximum pixel value, the minimum pixel value, and the plurality of reference value candidates;
divide each of the pixel blocks into a plurality of subblocks;
select, as a reference value from among the plurality of reference value candidates in each of the subblocks, a reference value candidate close to the pixel values in which the pixels included in each of the subblocks are distributed;
extract, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value;

quantize each of the closest difference values into a quantization value by using, as a reference, the difference value that is the largest from among the plurality of extracted closest difference values; and code the quantization value for each of the pixel blocks.

2. The image processing device according to claim 1, wherein the selecting of the reference value candidate includes:

adding, for each of the reference value candidates in each of the subblocks, an absolute difference value that is the smallest from among the absolute difference values relative to the current reference value candidate, the maximum pixel value, and the minimum pixel value calculated for each of the pixels to obtain the sum of the minimum differences for each of the reference value candidates; and selecting, as the reference value, a reference value candidate when the smallest sum of the minimum differences is achieved from among the plurality of sums of the minimum differences.

3. The image processing device according to claim 1, wherein the extracting of the closest difference value includes:

setting a plurality of zones on the basis of the maximum pixel value, the reference value, and the minimum pixel value; and generating, for each of the pixels, zone information that indicates a zone to which the pixel belongs.

4. The image processing device according to claim 1, wherein the quantizing of each of the closest difference values includes:

determining a quantization width so that the bit length of the difference value that is the largest from among the plurality of closest difference values is a target bit length; and generating quantization width information indicating the quantization width.

5. The image processing device according to claim 1, wherein the input image is RAW data.

6. The image processing device according to claim 1, wherein the input image is data for a luminance signal or a color difference signal.

7. The image processing device according to claim 1, wherein the input image is data for each color of a color signal.

8. The image processing device according to claim 1, wherein the input image is pixel data in which the bit lengths are all identical as a result of converting RAW data or quantizing the RAW data in a fixed manner.

9. The image processing device according to claim 1, wherein the input image is pixel data in which the bit lengths are all identical as a result of converting a luminance signal or a color difference signal or quantizing the luminance signal or the color difference signal in a fixed manner.

10. The image processing device according to claim 1, wherein the input image is pixel data in which the bit lengths are all identical as a result of converting data for each color of a color signal or quantizing the data for each color of a color signal in a fixed manner.

11. An image processing device comprising:

a processor comprising hardware, wherein the processor is configured to:

extract, from input coded data, a block in which a pixel block including a plurality of pixels is compression-coded;

dequantize quantization values included in the block into dequantization values on the basis of quantization width information included in the block;

divide the block into a plurality of decoding subblocks corresponding to subblocks of the pixel block set at the time of compression-coding;

calculate a reference value for each of the decoding subblocks from a maximum pixel value, a minimum pixel value, and reference value information included in the block; and decode pixel data from the dequantization values, the reference value, and pixel data zone information that is associated with each of the quantization values and that indicates a zone to which each of the pixels belongs.

12. An image processing method comprising:

extracting, from an input image, pixel blocks each including a plurality of pixels;

detecting pixels having a maximum pixel value and a minimum pixel value in each of the pixel blocks;

calculating a plurality of reference value candidates that can be calculated from the maximum pixel value and the minimum pixel value;

calculating, for each of the pixels included in each of the pixel blocks, an absolute difference value relative to each of the maximum pixel value, the minimum pixel value, and the plurality of reference value candidates;

dividing each of the pixel blocks into a plurality of subblocks;

selecting, as a reference value from among the plurality of reference value candidates in each of the subblocks, a reference value candidate close to the pixel values in which the pixels included in each of the subblocks are distributed;

extracting, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value;

quantizing each of the closest difference values into a quantization value by using, as a reference, the difference value that is the largest from among the plurality of extracted closest difference values; and coding the quantization value for each of the pixel blocks.

13. A non-transitory computer readable medium storing an image processing program for causing a computer to execute image processing comprising:

extracting, from an input image, pixel blocks each including a plurality of pixels;

detecting pixels having a maximum pixel value and a minimum pixel value in each of the pixel blocks;

calculating a plurality of reference value candidates that can be calculated from the maximum pixel value and the minimum pixel value;

calculating, for each of the pixels included in each of the pixel blocks, an absolute difference value relative to each of the maximum pixel value, the minimum pixel value, and the plurality of reference value candidates;

dividing each of the pixel blocks into a plurality of subblocks;
selecting, as a reference value from among the plurality of reference value candidates in each of the subblocks, a reference value candidate close to the pixel values in which the pixels included in each of the subblocks are distributed;
extracting, from among the absolute difference values for each of the pixels included in each of the pixel blocks, a closest difference value, which is the absolute difference value relative to the value that is closest to the pixel value of the current pixel from among the absolute difference values relative to the maximum pixel value, the minimum pixel value, and the reference value;
quantizing each of the closest difference values into a quantization value by using, as a reference, the difference value that is the largest from among the plurality of extracted closest difference values; and
coding the quantization value for each of the pixel blocks.

14. An image processing method comprising:
extracting, from input coded data, a block in which a pixel block including a plurality of pixels is compression-coded;
dequantizing quantization values included in the block into dequantization values on the basis of quantization width information included in the block;
dividing the block into a plurality of decoding subblocks corresponding to subblocks of the pixel block set at the time of compression-coding;
calculating a reference value for each of the decoding subblocks from a maximum pixel value, a minimum pixel value, and reference value information included in the block; and
decoding pixel data from the dequantization values, the reference value, and pixel data zone information that is associated with each of the quantization values and that indicates a zone to which each of the pixels belongs.

15. A non-transitory computer readable medium storing an image processing program for causing a computer to execute image processing comprising:
extracting, from input coded data, a block in which a pixel block including a plurality of pixels is compression-coded;
dequantizing quantization values included in the block into dequantization values on the basis of quantization width information included in the block;
dividing the block into a plurality of decoding subblocks corresponding to subblocks of the pixel block set at the time of compression-coding;
calculating a reference value for each of the decoding subblocks from a maximum pixel value, a minimum pixel value, and reference value information included in the block; and
decoding pixel data from the dequantization values, the reference value, and pixel data zone information that is associated with each of the quantization values and that indicates a zone to which each of the pixels belongs.

* * * * *